(12) United States Patent
Cheng et al.

(10) Patent No.: US 11,467,416 B2
(45) Date of Patent: Oct. 11, 2022

(54) DISPLAY SYSTEM WITH SPATIAL LIGHT MODULATOR ILLUMINATION FOR DIVIDED PUPILS

(71) Applicant: Magic Leap, Inc., Plantation, FL (US)

(72) Inventors: Hui-Chuan Cheng, Cooper City, FL (US); Chulwoo Oh, Cedar Park, TX (US); Clinton Carlisle, Parkland, FL (US); Michael Anthony Klug, Austin, TX (US); William J. Molteni, Jr., Nibley, UT (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/351,110

(22) Filed: Jun. 17, 2021

(65) Prior Publication Data

US 2021/0382317 A1    Dec. 9, 2021

Related U.S. Application Data

(62) Division of application No. 15/928,015, filed on Mar. 21, 2018, now Pat. No. 11,079,603.
(Continued)

(51) Int. Cl.
*G02B 27/09* (2006.01)
*G02B 27/01* (2006.01)
(Continued)

(52) U.S. Cl.
CPC ..... *G02B 27/0944* (2013.01); *G02B 27/0172* (2013.01); *G02B 27/1026* (2013.01);
(Continued)

(58) Field of Classification Search
CPC ............ G02B 27/0944; G02B 27/0172; G02B 27/1026; G02B 27/1046; G02B 2027/0174
(Continued)

(56) References Cited

U.S. PATENT DOCUMENTS 6,750,995 B2    6/2004 Dickson
6,850,221 B1    2/2005 Tickle
(Continued)

FOREIGN PATENT DOCUMENTS

CN    103038567 A    4/2013
CN    103038568 A    4/2013
(Continued)

OTHER PUBLICATIONS

International Search Report and Written Opinion for PCT Application No. PCT/US2018/023652, dated Jun. 7, 2018.
(Continued)

*Primary Examiner* — Jerry M Blevins
(74) *Attorney, Agent, or Firm* — Fish & Richardson P.C.

(57) ABSTRACT

Illuminations systems that separate different colors into laterally displaced beams may be used to direct different color image content into an eyepiece for displaying images in the eye. Such an eyepiece may be used, for example, for an augmented reality head mounted display. Illumination systems may be provided that utilize one or more waveguides to direct light from a light source towards a spatial light modulator. Light from the spatial light modulator may be directed towards an eyepiece. Some aspects of the invention provide for light of different colors to be outcoupled at different angles from the one or more waveguides and directed along different beam paths.

11 Claims, 32 Drawing Sheets

Related U.S. Application Data

(60) Provisional application No. 62/474,568, filed on Mar. 21, 2017.

(51) Int. Cl.
  *G02B 27/10* (2006.01)
  *G06T 19/00* (2011.01)

(52) U.S. Cl.
  CPC .. *G02B 27/1046* (2013.01); *G02B 2027/0174* (2013.01); *G06T 19/006* (2013.01)

(58) Field of Classification Search
  USPC .......................................................... 359/34
  See application file for complete search history.

(56) References Cited

U.S. PATENT DOCUMENTS

| | | |
|---|---|---|
| 9,081,426 B2 | 7/2015 | Armstrong |
| 9,557,473 B2 | 1/2017 | Nicol et al. |
| 11,079,603 B2 | 8/2021 | Cheng et al. |
| 2003/0007201 A1 | 1/2003 | Dickson |
| 2005/0232530 A1 | 10/2005 | Kekas |
| 2006/0028436 A1 | 2/2006 | Armstrong |
| 2006/0056028 A1 | 3/2006 | Wildnauer |
| 2007/0081123 A1 | 4/2007 | Lewis |
| 2009/0128911 A1 | 5/2009 | Itzkovitch et al. |
| 2011/0242661 A1 | 10/2011 | Simmonds |
| 2011/0273906 A1 | 11/2011 | Nichol et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2013/0308185 A1 | 11/2013 | Robinson et al. |
| 2014/0049983 A1* | 2/2014 | Nichol ................ G02B 6/0018 362/610 |
| 2014/0071539 A1 | 3/2014 | Gao |
| 2014/0140654 A1 | 5/2014 | Brown et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski |
| 2016/0033698 A1 | 2/2016 | Escuti et al. |
| 2016/0327789 A1 | 11/2016 | Klug et al. |
| 2016/0377907 A1 | 12/2016 | Wu et al. |
| 2017/0373459 A1 | 12/2017 | Weng et al. |
| 2018/0284460 A1 | 10/2018 | Cheng et al. |

FOREIGN PATENT DOCUMENTS

| | | |
|---|---|---|
| CN | 103299358 A | 9/2013 |
| CN | 103823267 A | 5/2014 |
| CN | 104914588 A | 9/2015 |
| CN | 105934902 A | 9/2016 |
| CN | 106371218 A | 2/2017 |
| CN | 106443867 A | 2/2017 |
| CN | 106501938 A | 3/2017 |
| EP | 2 196 729 | 6/2010 |
| EP | 2 733 517 | 5/2014 |
| JP | 2005157164 A | 6/2005 |
| JP | 2011123499 A | 6/2011 |
| JP | 2015525493 A | 9/2015 |
| JP | 2018521350 A | 8/2018 |
| JP | 2021516359 A | 7/2021 |
| WO | WO 2007/031992 | 3/2007 |
| WO | WO 2011/130718 | 10/2011 |
| WO | WO 2018/175653 | 9/2018 |

OTHER PUBLICATIONS

International Preliminary Report on Patentability for PCT Application No. PCT/US2018/023652, dated Sep. 24, 2019.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hili, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Mukawa et al., "A full-color eyewear display using planar waveguides with reflection volume holograms," Journal of the Society for Information Display, The Society for Information Display, Jan. 2009, 17(3):185-193.

Office Action in Japanese Appln. No. 2019-550768, dated Feb. 2, 2022, 10 pages (with English translation).

Search Report in Japanese Appln. No. 2019-550768, dated Jan. 14, 2022, 30 pages (with English translation).

Supplementary Search Report in Chinese Appln. No. 201880032797X, dated Jan. 25, 2021, 2 pages.

\* cited by examiner

DISPLAY SYSTEM WITH SPATIAL LIGHT MODULATOR ILLUMINATION FOR DIVIDED PUPILS

INCORPORATION BY REFERENCE

This application is a divisional application of U.S. patent application Ser. No. 15/928,015, filed on Mar. 21, 2018, entitled "DISPLAY SYSTEM WITH SPATIAL LIGHT MODULATOR ILLUMINATION FOR DIVIDED PUPILS," which claims the benefit of priority under 35 U.S.C. § 119(e) to U.S. Provisional Application No. 62/474,568, filed on Mar. 21, 2017, each of which are hereby incorporated by reference herein in their entirety.

BACKGROUND

Field

The present disclosure relates to optical devices, including virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY OF THE INVENTION

Figure 1:
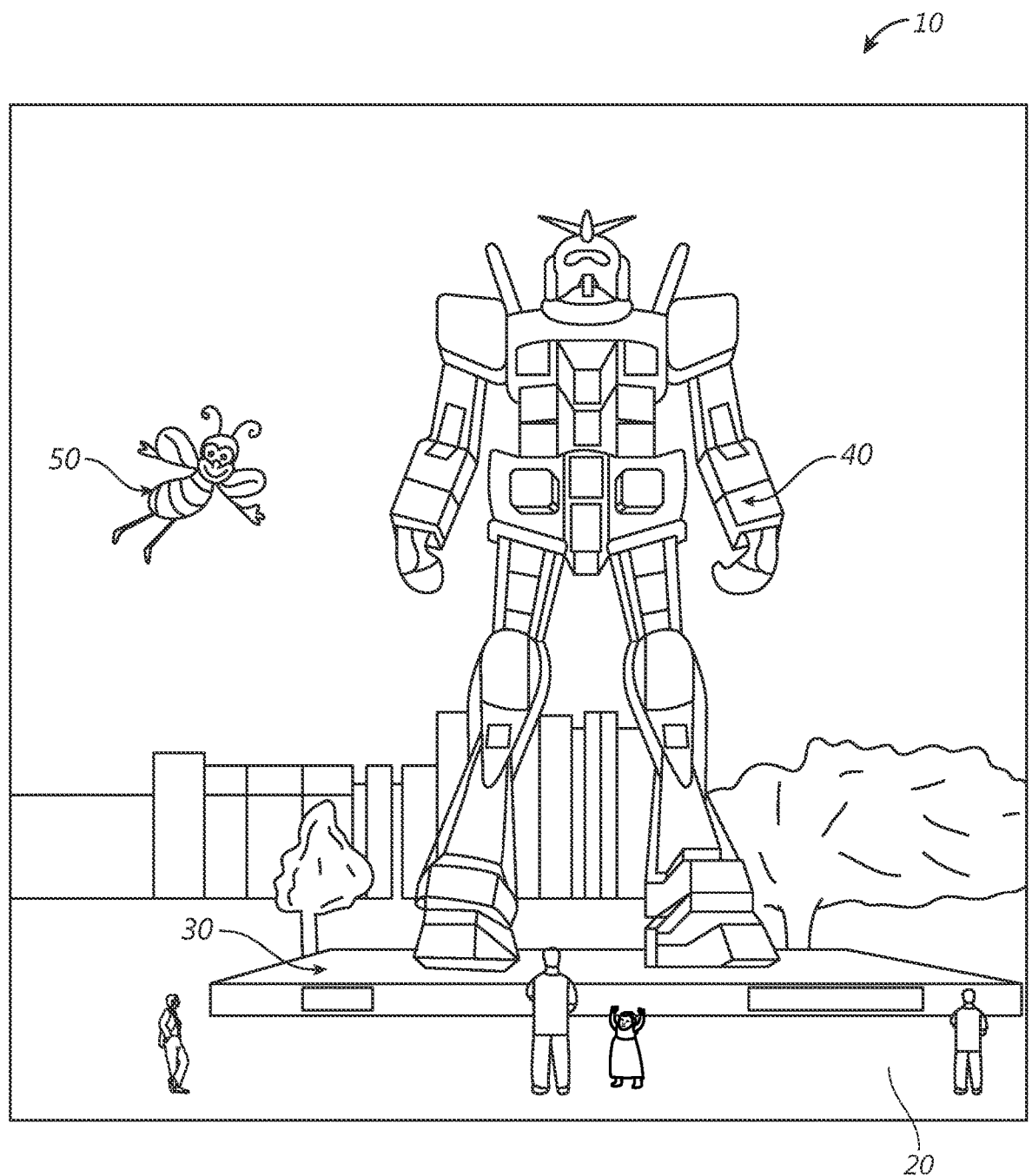
FIG. 1 illustrates a user's view of augmented reality (AR) through an AR device.

According to some aspects, a display device may be provided, comprising:

one or more light emitters configured to emit light;

a first waveguide disposed with respect to said one or more light emitters to receive light from said one or more light emitters, said first waveguide configured to (i) eject light out of said waveguide having a first color along a first path, and (ii) eject light out of said first waveguide having a second color along a second path; and a spatial light modulator disposed with respect to said first waveguide to receive said light ejected from said waveguide and modulate said light, wherein said one or more light emitters is configured to emit light having a spectral distribution that includes spectral components corresponding to said first and second colors, and wherein said display device is configured such that said light from said first waveguide of said first color and said second color after being modulated by said spatial light modulator is directed along said respective first and second paths at different angles and is incident on respective first and second spatial locations a distance from said first waveguide and spatial light modulator.

According to other aspects, a display device may be provided, comprising:

one or more light emitters configured to emit light;

a first waveguide disposed with respect to said one or more light emitters to receive light from said one or more light emitters such that said light is guided therein by total internal reflection, said first waveguide configured to eject light guided within said first waveguide out of said waveguide;

a shutter system comprising a first shutter and a second shutter and corresponding first and second color filters configured to selectively transmit first and second color light, respectively, said shutter system disposed with respect to said first waveguide to receive said light ejected from said waveguide such that light of said first and second colors from said first waveguide passes through said respective first and second color filters, respectively, as well as through said respective first shutter and second shutters along respective first and second optical paths to respective first and second spatial location at a distance from said first waveguide;

a spatial light modulator disposed with respect to said first waveguide to receive said light ejected from said waveguide and modulate said light, said shutter system disposed with respect to said spatial light modulator such that said modulated light is directed along said first and second optical paths to said respective first and second spatial location at a distance from said spatial light modulator; and electronics in communication with said shutter system and said spatial light modulator to (i) open said shutter associated with said first color at a first time and close said shutter associated with said second color when said spatial light modulator is configured to present an image corresponding to said first color and (ii) to open said shutter associated with said second color and close said shutter associated with said first color at a second time when said spatial light modulator is configured to present an image corresponding to said second color, wherein said one or more light emitters is configured to emit light having a spectral distribution that includes spectral components corresponding to said first and second colors.

According to other embodiments, a display device may be provided, comprising:

one or more light emitters configured to emit light;

a first waveguide disposed with respect to said one or more light emitters to receive light from said one or more light emitters such that said light is guided therein by total internal reflection, said first waveguide configured to eject light guided within said first waveguide out of said waveguide;

a first beamsplitter configured to selectively direct light of a first spectral distribution and a first color light along a first direction and a second spectral distribution along a second direction, said first beamsplitter disposed with respect to said first waveguide to receive said light ejected from said waveguide such that light of said first and second spectral distributions from said first waveguide are incident on said first beamsplitter and said light having said first and second spectral distributions are directed along respective first and second optical paths, said light of said first spectral distribution and first color being directed to a respective first spatial location at a distance from said first waveguide; and a spatial light modulator disposed with respect to said first waveguide to receive said light ejected from said waveguide and modulate said light, said first beamsplitter disposed with respect to said spatial light modulator such that said modulated light is directed along said first and second optical paths and said light of said first color is directed to said first spatial location at a distance from said spatial light modulator, wherein said one or more light emitters is configured to emit light having a spectral distribution that includes spectral components corresponding to said first and second spectral distribution directed along said respective first and second optical paths.

According to further aspects, a display device may be provided for a head mounted display comprising:

a waveguide based image source comprising:
one or more light emitters configured to emit light;
one or more waveguides disposed with respect to said one or more light emitters to receive light from said one or more light emitters such that light is guided within said one or more light guides via total internal reflection, said one or more waveguides configured to eject light out of said waveguides; and
a spatial light modulator disposed with respect to one or more waveguides to receive said light ejected from said one or more waveguides and modulate said light,
wherein said one or more light emitters are configured to emit light having a spectral distribution that includes spectral components corresponding to first and second colors, and
said waveguide based image source is configured such that said light of said first and second colors after being modulated by said spatial light modulator is directed along said respective first and second paths and is incident on respective first and second spatial locations a distance from said one or more waveguides and said spatial light modulator, and an eyepiece element comprising a waveguide based light distribution system comprising:
a first waveguide having associated therewith an in-coupling optical element disposed with respect to one or more first waveguides and said first path to receive light from said one or more waveguides after being modulated by said spatial light modulator; and
a second waveguide having associated therewith an in-coupling optical element disposed with respect to said one or more waveguides and said second path to receive light from said one or more waveguides after being modulated by said spatial light modulator,
wherein said in-coming optical elements associated with said first and second waveguides, respectively, are located at said first and second spatial locations along said first and second paths respectively to receive said light of said first and second colors, respectively.

DETAILED DESCRIPTION

Reference will now be made to the figures, in which like reference numerals refer to like parts throughout. It will be appreciated that embodiments disclosed herein include optical systems, including display systems, generally. In some embodiments, the display systems are wearable, which may advantageously provide a more immersive VR or AR experience. For example, displays containing one or more waveguides (e.g., a stack of waveguides) may be configured to be worn positioned in front of the eyes of a user, or viewer. In some embodiments, two stacks of waveguides, one for each eye of a viewer, may be utilized to provide different images to each eye.

Example Display Systems

Figure 2:
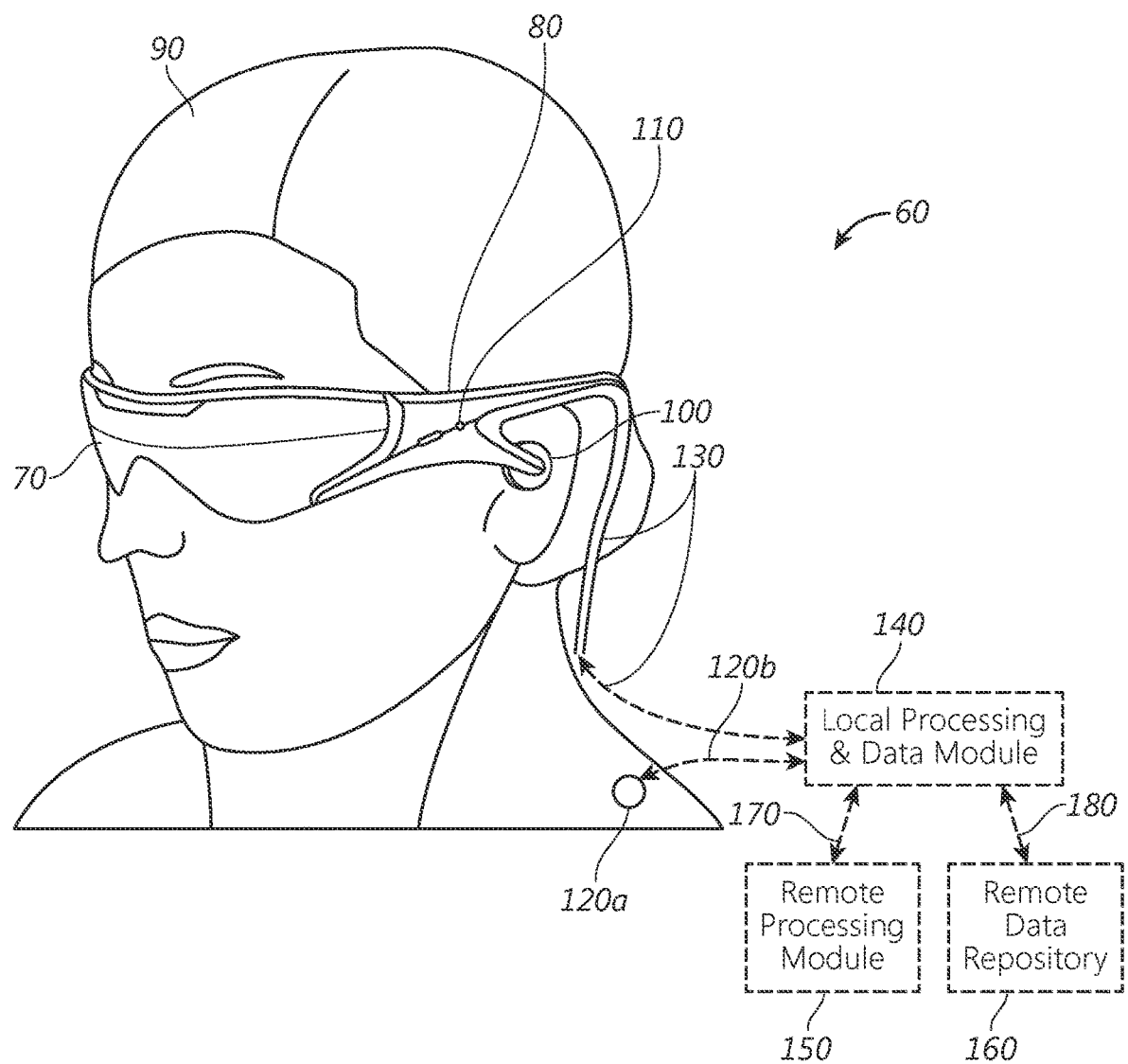
FIG. 2 illustrates an example of a wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, is positioned adjacent the other ear canal of the user to provide stereo/shapeable sound control). In some embodiments, the display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing the physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
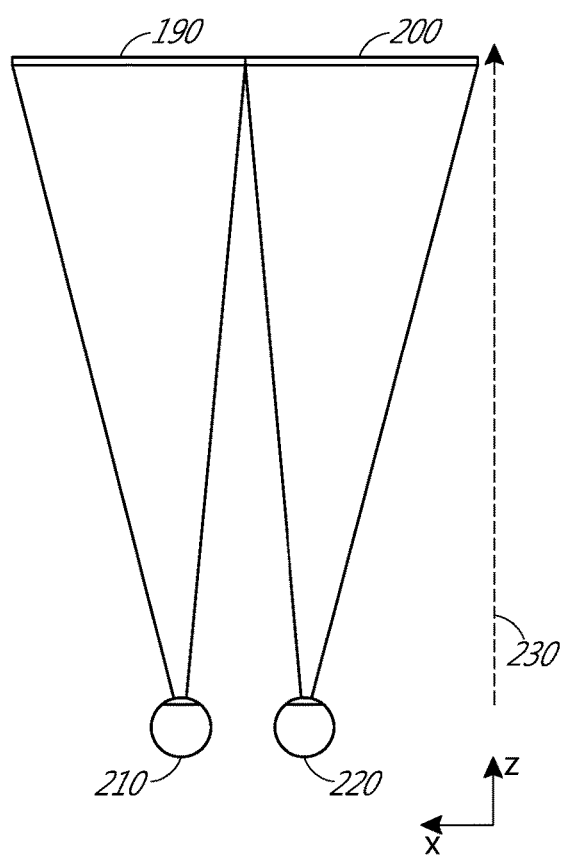
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
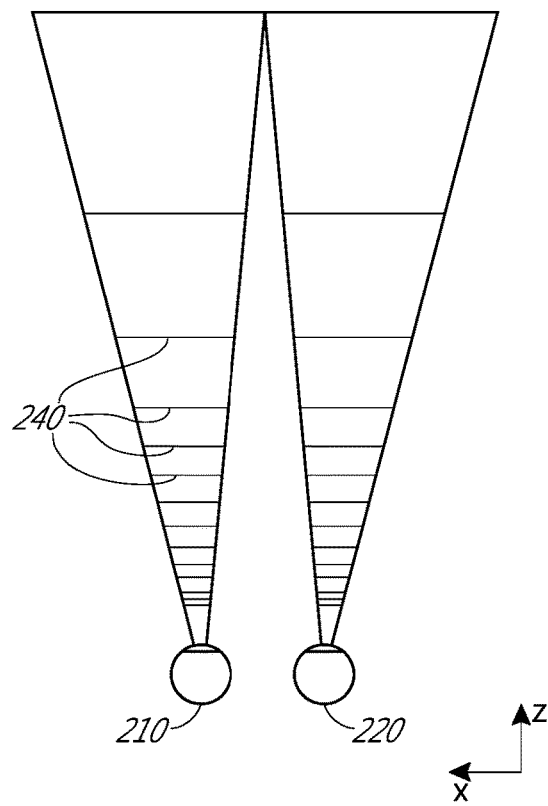
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
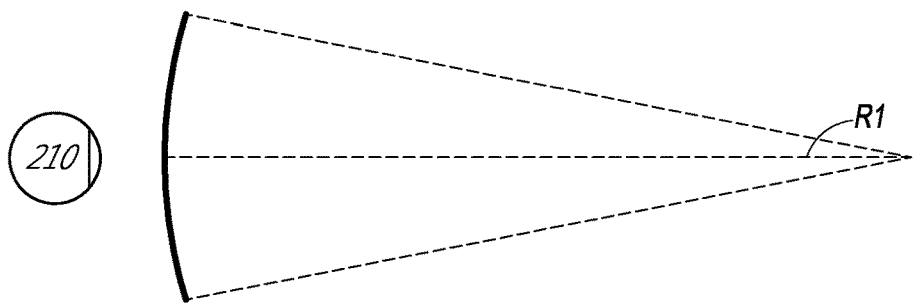
FIGS. 5A-5C illustrate relationships between radius of curvature and focal radius.
Figure 5B:
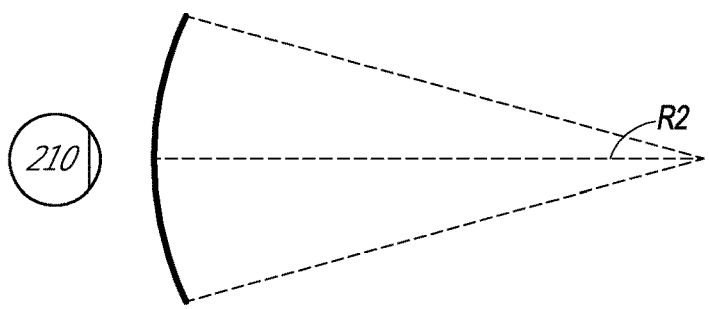
Figure 5C:
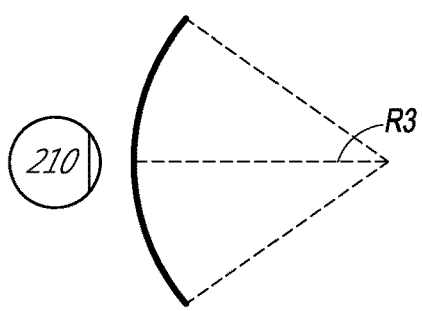

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
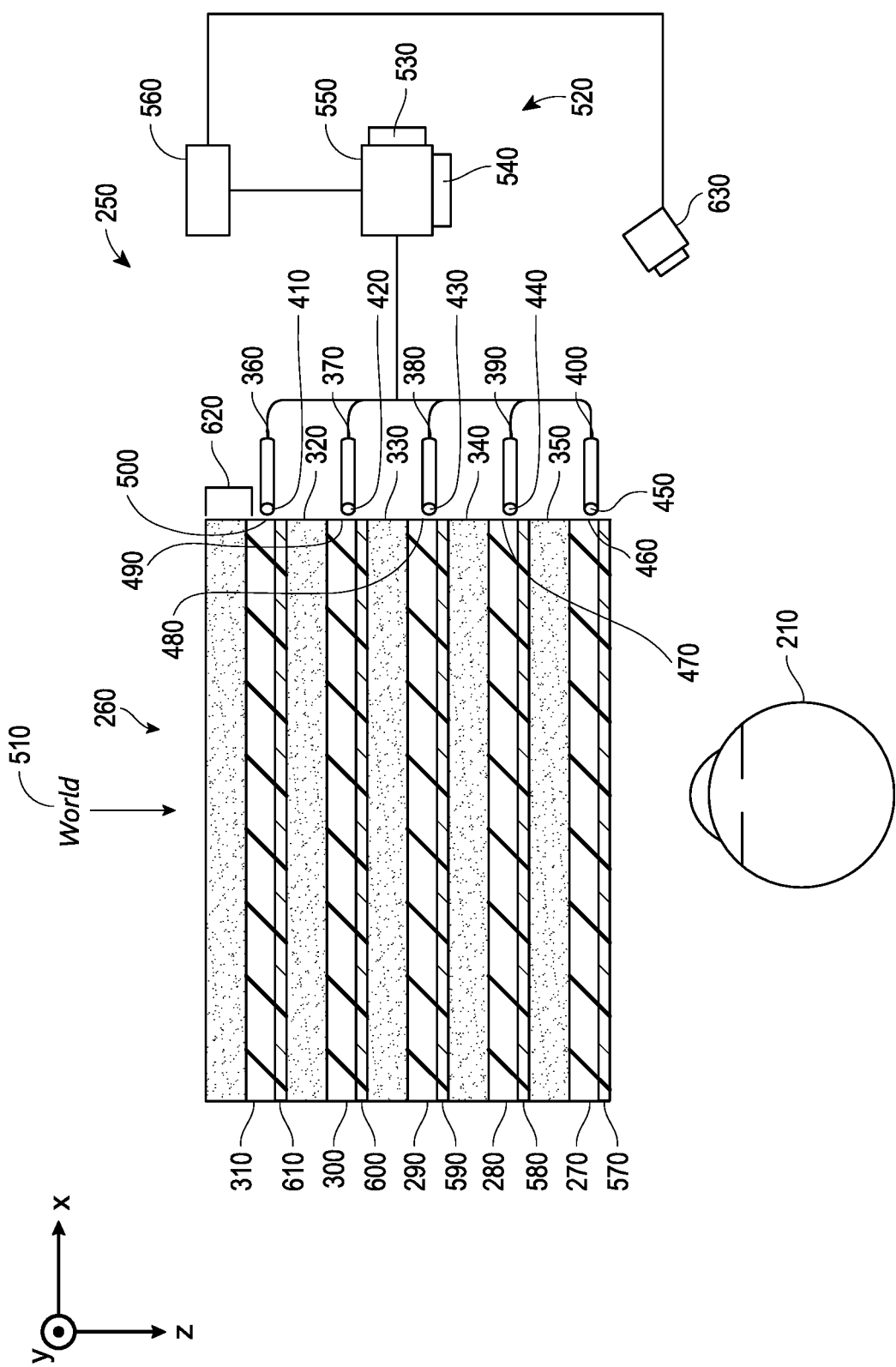
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light emitter 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light emitter to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 630 may be utilized for each eye, to separately monitor each eye.

Figure 7:
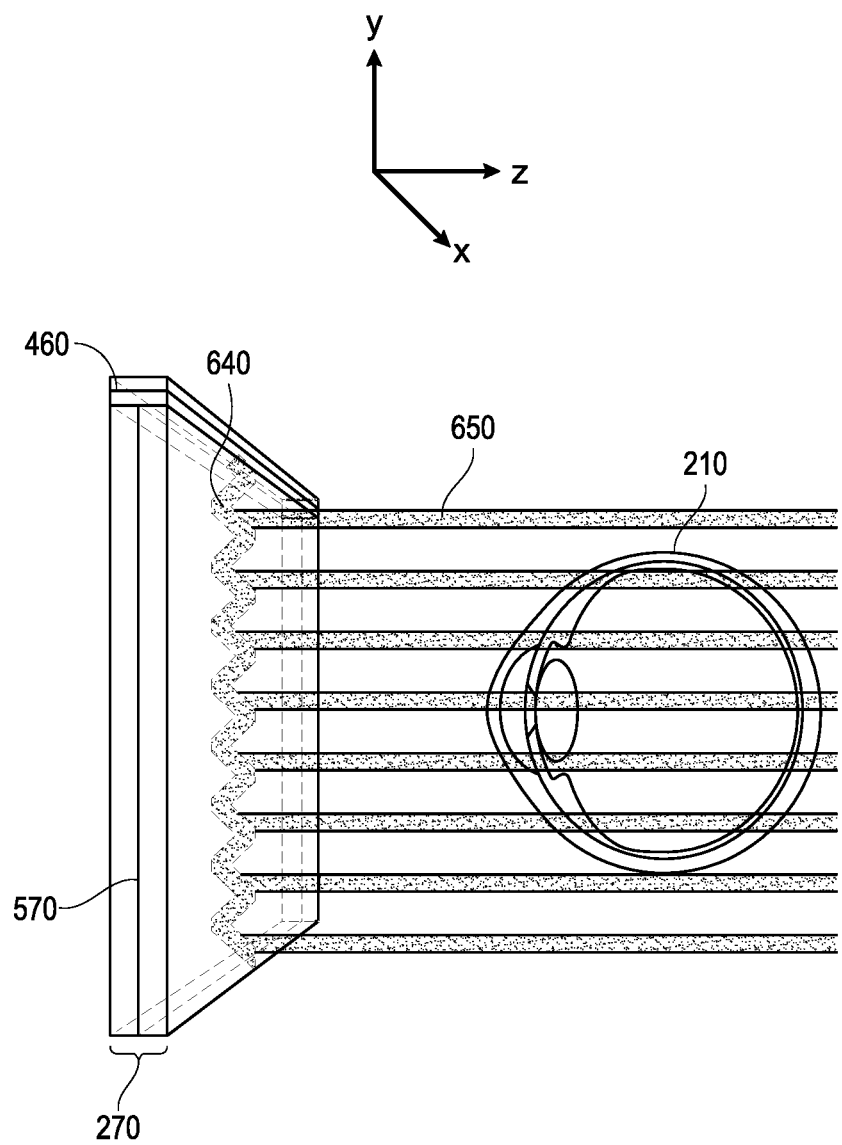
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide without-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
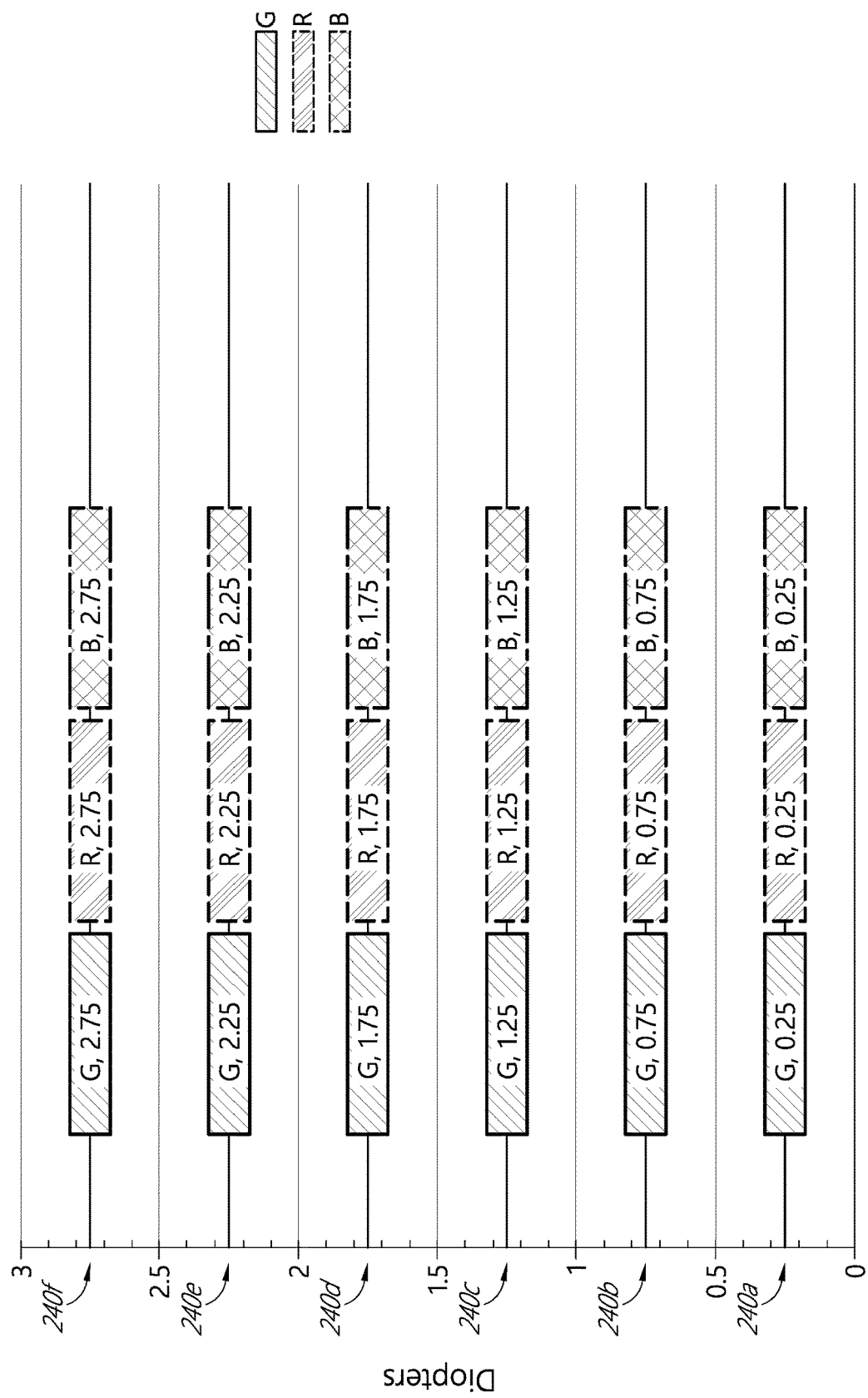
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 320, 330, 340, and 350 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light emitter 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
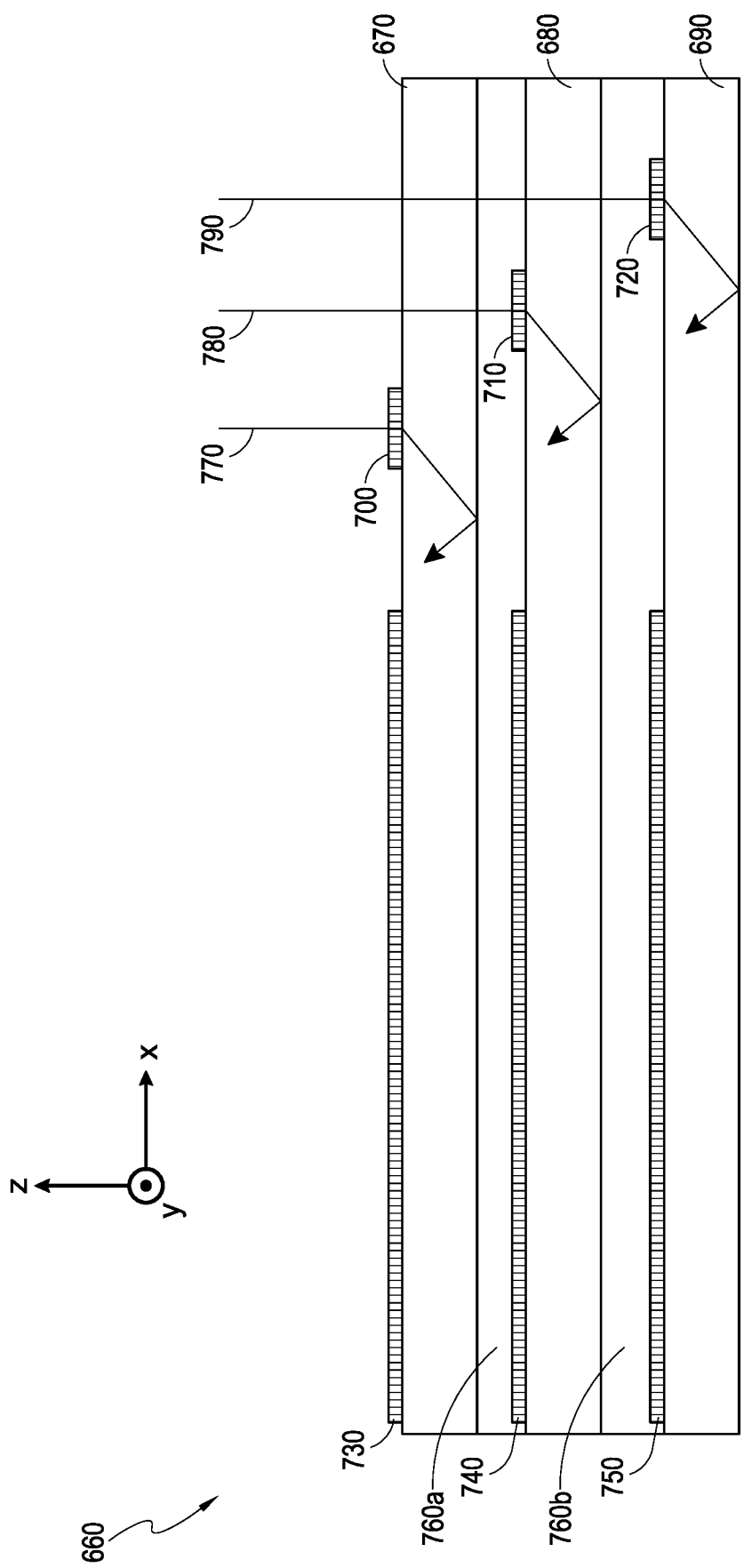
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of one or more, or set of stacked waveguides 660 that each includes an in-coupling optical element. The waveguides may each be configured to output light of one or more different wavelengths, or one or more different ranges of wavelengths. It will be appreciated that the set of stacked waveguides 660 may correspond to the stack 260 (FIG. 6) and the illustrated waveguides of the set of stacked waveguides 660 may correspond to part of the one or more waveguides 270, 280, 290, 300, 310, except that light from one or more of the image injection devices 360, 370, 380, 390, 400 is injected into the waveguides from a position that requires light to be redirected for in-coupling.

The set of stacked waveguides 660 includes waveguides 670, 680, and 690. Each waveguide includes an associated in-coupling optical element (which may also be referred to as a light input area on the waveguide), with an in-coupling optical element 700 disposed on a major surface (e.g., an upper major surface) of the waveguide 670, an in-coupling optical element 710 disposed on a major surface (e.g., an upper major surface) of the waveguide 680, and an in-coupling optical element 720 disposed on a major surface (e.g., an upper major surface) of the waveguide 690. In some embodiments, one or more of the in-coupling optical elements 700, 710, 720 may be disposed on the bottom major surface of the respective waveguide 670, 680, 690 (particularly where the one or more in-coupling optical elements are reflective optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that, in some embodiments, the in-coupling optical elements 700, 710, 720 may be disposed in other areas of their respective waveguide 670, 680, 690.

The in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device (e.g., the image injection devices 360, 370, 380, 390, and 400 as shown in FIG. 6), and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements with light distributing elements 730 disposed on a major surface (e.g., a top major surface) of the waveguide 670, light distributing elements 740 disposed on a major surface (e.g., a top major surface) of the waveguide 680, and light distributing elements 750 disposed on a major surface (e.g., a top major surface) of the waveguide 690. In some other embodiments, the light distributing elements 730, 740, 750, may be disposed on a bottom major surface of the associated waveguides 670, 680, 690, respectively. In some other embodiments, the light distributing elements 730, 740, 750, may be disposed on both top and bottom major surface of the associated waveguides 670, 680, 690, respectively; or the light distributing elements 730, 740, 750, may be disposed on different ones of the top and bottom major surfaces in different the associated waveguides 670, 680, 690, respectively.

The waveguides 670, 680, 690 may be spaced apart and separated by gas, liquid, and/or solid layers of material. For example, as illustrated, layer 760*a* may separate the waveguides 670 and 680; and layer 760*b* may separate the waveguides 680 and 690. In some embodiments, the layers 760a and 760b are formed of low refractive index materials (that is, materials having a lower refractive index than the material forming the immediately adjacent one of the waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, the top and bottom of the set of stacked waveguides 660 may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set of stacked waveguides 660. The light rays 770, 780, 790 may be injected into the waveguides 670, 680, 690 by one or more image injection devices 360, 370, 380, 390, 400.

In some embodiments, the light rays 770, 780, 790 have different properties, for example, different wavelengths or different ranges of wavelengths, which may correspond to different colors. The light rays 770, 780, 790 may also be laterally displaced to different locations corresponding to the lateral locations of the in-coupling optical elements 700, 710, 720. The in-coupling optical elements 700, 710, 720 each deflect the incident light such that the light propagates through a respective one of the waveguides 670, 680, 690 by TIR.

For example, the in-coupling optical element 700 may be configured to deflect ray 770, which has a first wavelength or range of wavelengths. Similarly, the in-coupling optical element 710 may be configured to deflect ray 780, which has a second wavelength or range of wavelengths. Likewise, the in-coupling optical element 720 may be configured to deflect ray 790, which has a third wavelength or range of wavelengths.

The deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide 670, 680, 690. The light rays 770, 780, 790 are deflected at angles that cause the light to propagate through the respective waveguide 670, 680, 690 by TIR, and thus be guided therein. For example, deflection of the light rays 770, 780, 790 may be caused by one or more reflective, diffractive, and/or holographic optical elements, such as a holographic, diffractive, and/or reflective turning feature, reflector, or mirror. Deflection may in some cases be caused by microstructure such as diffractive features in one or more gratings, and/or holographic and/or diffractive optical elements configured to turn or redirect light, for example, so as to be guided with the waveguide. The light rays 770, 780, 790 propagate through the respective waveguide 670, 680, 690 by TIR, being guided therein until impinging on the waveguide's corresponding light distributing elements 730, 740, 750.

Figure 9B:
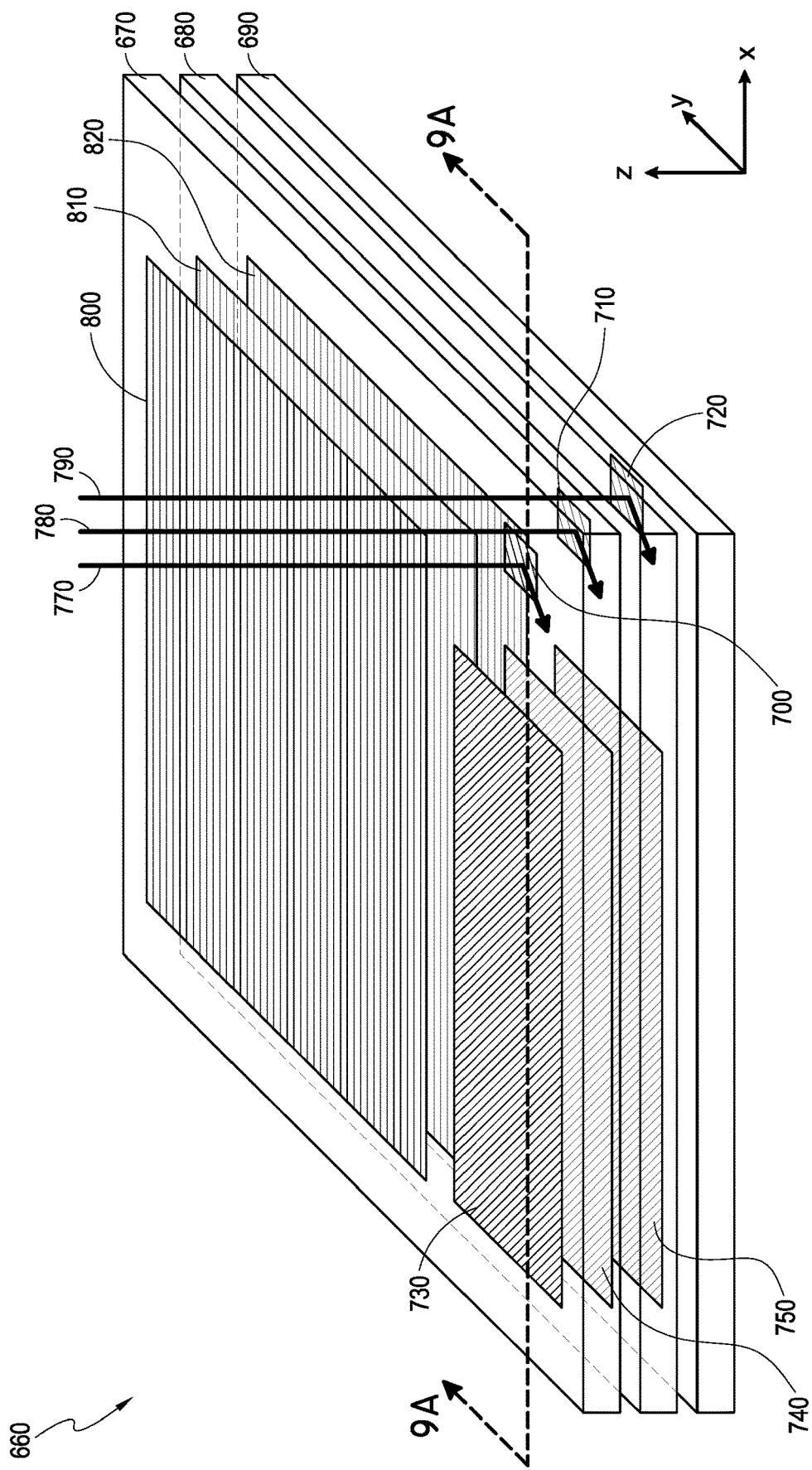
FIG. 9B illustrates a perspective view of an example of the plurality of stacked waveguides of FIG. 9A.

With reference now to FIG. 9B, a perspective view of an example of the set of stacked waveguides 660 of FIG. 9A is illustrated. As noted above, the in-coupled light rays 770, 780, 790, are deflected by the in-coupling optical elements 700, 710, 720, respectively, and then propagate by TIR and are guided within the waveguides 670, 680, 690, respectively. The guided light rays 770, 780, 790 then impinge on the light distributing elements 730, 740, 750, respectively. The light distributing elements 730, 740, 750 may include one or more reflective, diffractive, and/or holographic optical elements, such as a holographic, diffractive, and/or reflective turning feature, reflector, or mirror. Deflection may in some cases be caused by microstructures such as diffractive features in one or more gratings, and/or holographic and/or diffractive optical elements configured to turn or redirect light, for example, so as to be guided with the waveguide. The light rays 770, 780, 790 propagate through the respective waveguide 670, 680, 690 by TIR being guided therein until impinging on the waveguide's corresponding light distributing elements 730, 740, 750, where they are deflected, however, in a manner so that the light rays 770, 780, 790 are still guided within the waveguide. The light distributing elements 730, 740, 750 deflect the light rays 770, 780, 790 so that they propagate towards out-coupling optical elements 800, 810, 820, respectively.

The out-coupling optical elements 800, 810, 820 are configured to direct light rays 770, 780, 790 guided within the respective waveguides 670, 680, 690, out of the respective waveguides 670, 680, 690 and toward the viewer's eye. The out-coupling optical elements 800, 810, 820 may be configured therefore to deflect and redirect the light rays 770, 780, 790 guided within the respective waveguides 670, 680, 690, at a more normal angle with respect to the surfaces of the waveguides 670, 680, 690 so as to reduce the effects of TIR such that light rays 770, 780, 790 are not guided within the respective waveguides 670, 680, 690, but instead exits therefrom. Moreover, these out-coupling optical elements 800, 810, 820 may be configured to deflect and redirect light rays 770, 780, 790 toward the viewer's eye. Accordingly, the out-coupling optical elements 800, 810, 820 may include one or more reflective, diffractive, and/or holographic optical elements, such as a holographic, diffractive, and/or reflective turning feature, reflector, or mirror. Deflection may in some cases be caused by microstructure such as diffractive features in one or more gratings, and/or holographic and/or diffractive optical elements configured to turn or redirect the light rays 770, 780, 790 so as to be guided with the respective waveguide 670, 680, 690. The optical elements 800, 810, 820 may be configured to reflect, deflect, and/or diffract the light rays 770, 780, 790 so that they propagate out of the respective waveguides 670, 680, 690 toward the users eye.

In some embodiments, the light distributing elements 730, 740, 750 are orthogonal pupil expanders (OPE's). The OPE's may both deflect or distribute light to the out-coupling optical elements 800, 810, 820 and also replicate the beam or beams to form a larger number of beams which propagate to the out-coupling optical elements 800, 810, 820. As a beam travels along the OPE's, a portion of the beam may be split from the beam and travel in a direction orthogonal to the beam, in the direction of out-coupling optical elements 800, 810, 820. Orthogonal splitting of the beam in the OPE's may occur repeatedly along the path of the beam through the OPE's. For example, OPE's may include a grating having an increasing reflectance along the beam path such that a series of substantially uniform beamlets are produced from a single beam. In some embodiments, the out-coupling optical elements 800, 810, 820 are exit pupils (EP's) or exit pupil expanders (EPE's) that direct light in a viewer's eye 210 (FIG. 7). The OPE's may be configured to increase the dimensions of the eye box, for example, along the x direction, and the EPE's may be to increase the eye box in an axis crossing, for example, orthogonal to, the axis of the OPE's, e.g., along the y direction.

Accordingly, with reference to FIGS. 9A and 9B, in some embodiments, the set of stacked waveguides 660 includes waveguides 670, 680, 690, in-coupling optical elements 700, 710, 720, light distributing elements (e.g., OPE's), 740, 750, and out-coupling optical elements (e.g., EPE's) 800, 810, 820 for each component color. The waveguides 670, 680, 690 may be stacked with an air gap and/or cladding layer between each one. The in-coupling optical elements 700, 710, 720 redirect or deflect incident light (with different in-coupling optical elements receiving light of different wavelengths) into its respective waveguide 670, 680, 690. The light then propagates at an angle which will result in TIR within the respective waveguide 670, 680, 690, and the light is guided therein. In the example shown, the light ray 770 (e.g., blue light) is deflected by the first in-coupling optical element 700, and then continues to propagate within the waveguide 670 being guided therein, interacting with the light distributing element (e.g., OPE's) 730 where it is replicated into one or more rays propagating to the out-coupling optical element (e.g., EPE's) 800, in a manner described earlier. The light ray 780 (e.g., green light) will pass through the waveguide 670, with the light ray 780 impinging on and being deflected by the in-coupling optical element 710. The light ray 780 then bounces down the waveguide 680 via TIR, proceeding on to its light distributing element (e.g., OPE's) 740 where it is replicated into one or more rays propagating to the out-coupling optical element (e.g., EPE's) 810. Finally, the light ray 790 (e.g., red light) passes through the waveguides 670 and 680 to impinge on the light in-coupling optical elements 720 of the waveguide 690. The in-coupling optical elements 720 deflect the light ray 790 such that the light ray propagates to the light distributing element (e.g., OPE's) 750 by TIR, where it is replicated into one or more rays propagating to the out-coupling optical element (e.g., EPE's) 820 by TIR. The out-coupling optical element 820 then finally further replicates and out-couples the light rays 790 to the viewer, who also receives the out-coupled light from the other waveguides 670, 680.

Figure 9C:
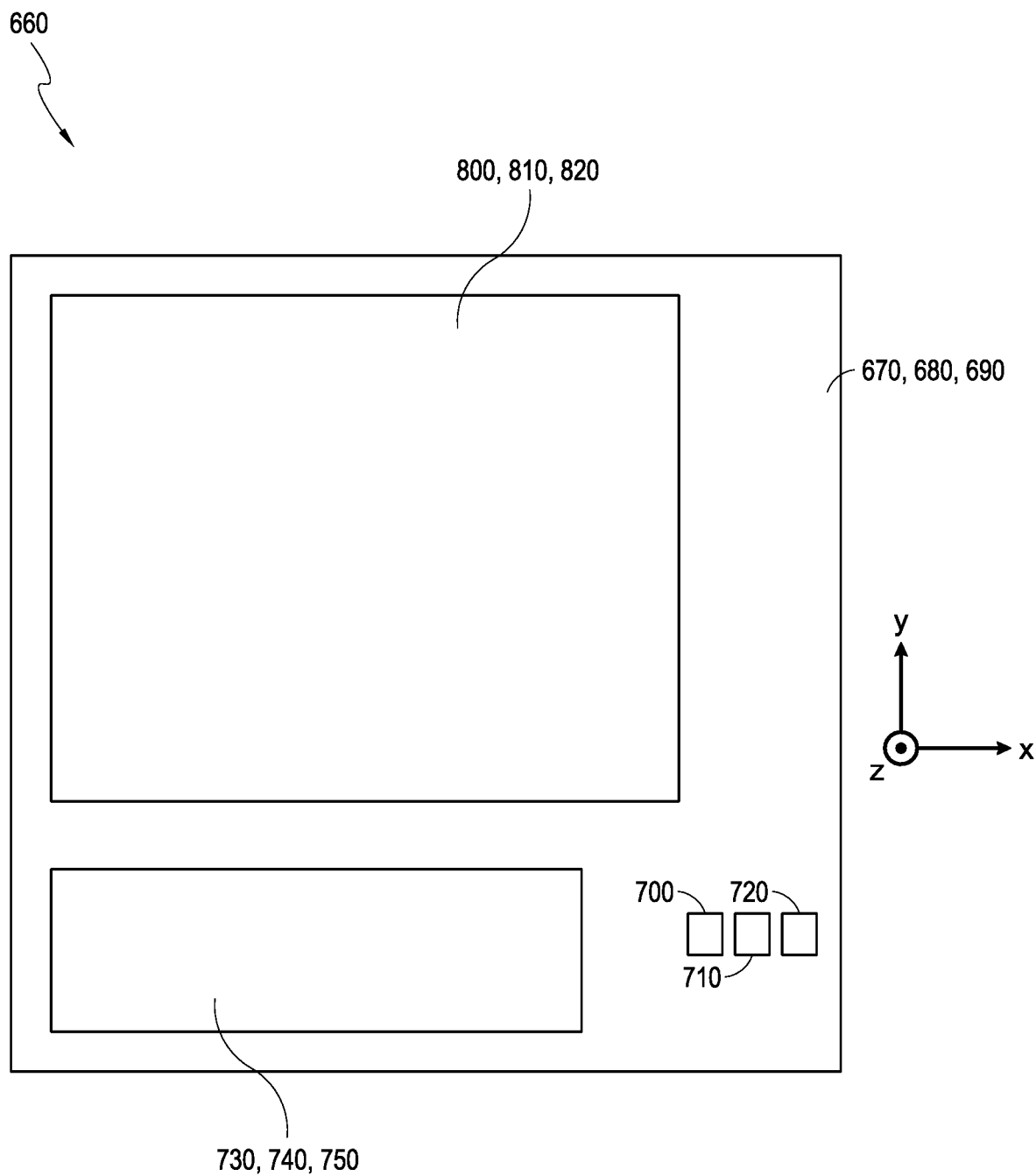
FIG. 9C illustrates a top-down plan view of an example of the plurality of stacked waveguides of FIGS. 9A and 9B.

FIG. 9C illustrates a top-down plan view (or front view) of an example of the set of stacked waveguides 660 of FIGS. 9A and 9B. As illustrated, the waveguides 670, 680, 690, along with each waveguide's associated light distributing element 730, 740, 750 and associated out-coupling optical element 800, 810, 820, may be vertically aligned (e.g., along the x and y directions). However, as discussed herein, the in-coupling optical elements 700, 710, 720 are not vertically aligned; rather, the in-coupling optical elements 700, 710, 720 are preferably non-overlapping (e.g., laterally spaced apart along the x direction as seen in the top-down view of front view in this example). Shifting in other directions, such as the y direction, can also be employed. This non-overlapping spatial arrangement facilitates the injection of light from different resources such as different light emitters and/or displays into different waveguides on a one-to-one basis, thereby allowing a specific light emitter to be uniquely coupled to a specific waveguide. In some embodiments, arrangements including non-overlapping laterally-separated in-coupling optical elements 700, 710, 720 may be referred to as a shifted pupil system, and the in-coupling optical elements within these arrangements may correspond to sub-pupils.

In addition to coupling light out of the waveguides, the out-coupling optical elements 800, 810, 820 may cause the light to be collimated or to diverge as if the light originated from an object at a far distance or a close distance, depth, or depth plane. Collimated light, for example, is consistent with light from an object that is far from the view. Increasing diverging light is consistent with light from an object that is closer, for example, 5-10 feet or 1-3 feet, in front of the viewer. The natural lens of the eye will accommodate when viewing an object closer to the eye and the brain may sense this accommodation, which also then serves as a depth cue. Likewise, by causing the light to be diverging by a certain amount, the eye will accommodate and perceive the object to be at closer distance. Accordingly, the out-coupling optical elements 800, 810, 820 can be configured to cause the light to be collimated or to diverge as if the light emanated from a far or a close distance, depth, or depth plane. To do so, the out-coupling optical elements 800, 810, 820 may include optical power. For example, the out-coupling optical elements 800, 810, 820, may include holographic, diffractive, and/or reflective optical elements that in addition to deflecting or re-directing the light out of the waveguides, these holographic, diffractive, and/or reflective optical elements may further include optical power to cause the light to be collimated or diverging. The out-coupling optical elements 800, 810, 820 may in the alternative or in addition include refracting surfaces that include optical power that cause the light to be collimated or diverging. The out-coupling optical elements 800, 810, 820 may therefore include, for example, in addition to diffractive or holographic turning features, a refractive surface the provides optical power. Such refractive surface may also be included in addition to the out-coupling optical elements 800, 810, 820, for example, on top of the out-coupling optical elements 800, 810, 820. In certain embodiments, for example, optical elements such as diffractive optical elements, holographic optical elements, refractive lens surfaces, or other structures may be disposed with respect to the out-coupling optical elements 800, 810, 820 to provide the optical power cause the collimation or divergence of the light. A layer with optical power such as a layer with a refractive surface or a layer with diffractive and/or holographic features may for example be disposed with respect to the out-coupling optical elements 800, 810, 820 to additionally provide optical power. A combination of contributions from both the out-coupling optical elements 800, 810, 820 having optical power and an additional layer with optical power such as a layer with a refractive surface or a layer with diffractive and/or holographic features is also possible.

Figure 9D:
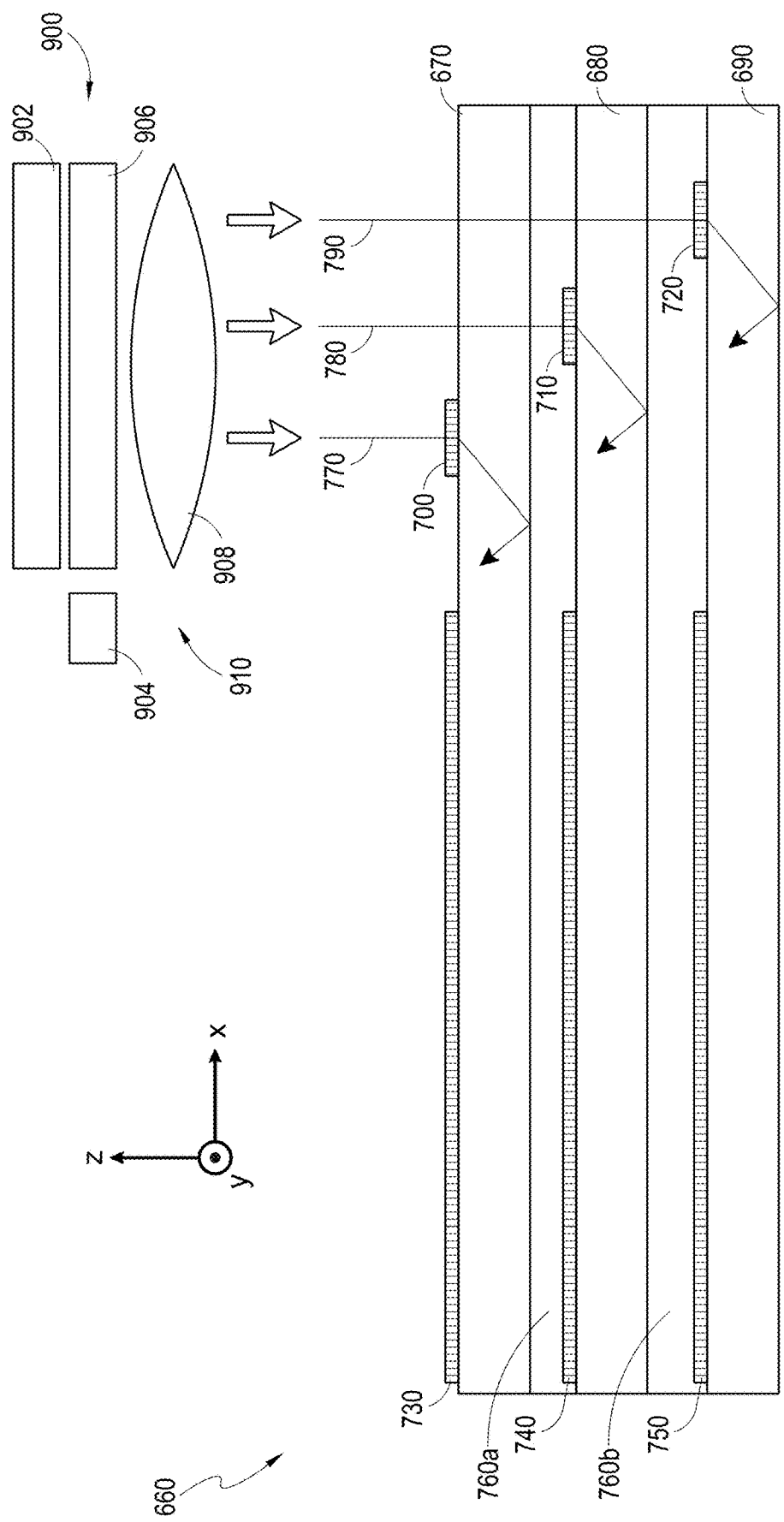
FIG. 9D illustrate a waveguide-based image source that provides multiple input beams to a plurality of incoupling optical elements integrated with a stack of waveguides that form part of an eyepiece.

As illustrated in FIG. 9D, a specialized illumination system 900 may provide multiple input light rays 770, 780, 790 to the one or more in-coupling optical elements 700, 710, and 720. This illumination system 900 illuminates a spatial light modulator 902 and directs the light rays 770, 780, 790 to separate spatial locations corresponding to the location of the in-coupling optical elements 700, 710, and 720.

The illumination system 900 may be waveguide based and includes one or more light emitters 904 configured to emit light and one or more light turning optical elements comprising waveguides 906 disposed with respect to the one or more light emitters 904 to receive light from the one or more light emitters 904. The received light is propagated within the light turning optical elements, for example, guided within the one or more waveguides 906 by TIR from the sides thereof.

The one or more waveguides 906 are also configured to eject light out of the one or more light turning optical elements comprising waveguides 906. For example, the one or more light turning optical elements comprising waveguides 906 may include a diffractive optical element, a diffraction grating, a holographic optical element, and/or a meta-surface configured to direct light out of the waveguide 906 onto the spatial light modulator 902. The spatial light modulator 902 is disposed with respect to the one or more waveguides 906 (for example, in front of or behind the one or more waveguides 906) to receive the light ejected from the one or more waveguides 906 and to modulate the received light. In the example shown in FIG. 9D, the waveguide 906 is a front light design that is configured to turn light out rearward towards the spatial light modulator 902 that is rearward of the waveguide 906. This light ejected out of the waveguide 906 is incident on the spatial light modulator 902 and reflects therefrom, if the spatial light modulator 902 is a reflective spatial light modulator. The spatial light modulator 902 may include, for example, a reflective liquid crystal modulator (e.g., liquid crystal on silicon (LCOS)), a digital light processing (DLP) micro mirror system, or other type of spatial light modulator. The spatial light modulator 902 includes one or more pixels that can be independently modulated to create, for example, an intensity pattern. For certain types of spatial light modulators 902, the spatial light modulator 902 modulates the polarization state of the light and, in some embodiments, a polarizer or other polarization selective optical element translates the polarization modulation into an intensity modulation. The spatial light modulator 902 may be in electrical communication with electronics that drive the spatial light modulator 902 and controls the spatial light modulator 902 so as to form images. Electronics may also control the one or more light emitter 904 and coordinate the timing of the emissions provided by the one or more light emitter 904 such when a light of a given color illuminates the spatial light modulator 906 (via the waveguide 906), the spatial light modulator 902 is driven to provide the proper pattern for that color. Imaging optics 908 may be disposed with respect to the spatial light modulator 902 to received light therefrom and to image the intensity pattern (or image) formed by the spatial light modulator 902. Although a single positive power biconvex lens is shown to represent the imaging optics 908, the imaging optics 908 may include more than one lens and need not be limited to a biconvex lens but may have other shapes, powers, configurations and optical characteristics.

FIG. 9D shows a waveguide based image source 910 including the spatial light modulator 902, the one or more light emitters 904 and the one or more waveguides 906 and the imaging optics 908 configured to provide illumination. The spatial light modulator 902 is configured to modulate the light from the illumination system 900 to yield an intensity image, and imaging optics 908 is configured to project the images formed by the spatial light modulator 902. Because this waveguide based image source 910 utilizes one or more waveguides 906 to illuminate the spatial light modulator 902, the waveguide based image source 910 is thinner and thus lighter and more compact. Additionally, as a result of the waveguide 906 being thin, the imaging optics 908 can be disposed closer to the spatial light modulator 902. This allows the imaging optics 908 also to be smaller.

The one or more light emitters 904 can be configured to emit light having a spectral distribution that includes spectral components corresponding to different colors such as red, green, and blue. The one or more light emitters 904 may include light emitting diodes (LEDs), such as color LEDs like red, green, and blue LEDs. The waveguide based image source 910 can be configured such that the light of different colors (e.g., red, green, and blue) after being modulated by the spatial light modulator 902 are directed along respective paths (e.g., paths corresponding to light rays 770, 780, and 790) and are incident on respective spatial locations (e.g., locations corresponding to in-coupling optical elements 700, 710, and 720) a distance from the one or more waveguides 906 and the spatial light modulator 902.

The imaging optics 908 may, for example, a lens or lens system (e.g. a convex lens) collimating or imaging light modulated by spatial light modulator 902.

As illustrated in FIG. 9D, the set of stacked waveguides 660 is disposed to receive the light rays 770, 780, 790 from the waveguide based image source 910. In particular, FIG. 9D shows the first waveguide 670 and the in-coupling optical element 700 (e.g., for receiving red light from the image source 910), the second waveguide 680 and the in-coupling optical element 710 (e.g., for receiving green light from the image source 910), and the third waveguide 690 and the in-coupling optical element 720 (e.g., for receiving blue light from the image source 910). Each of these in-coupling optical elements 700, 710, 720 are disposed with respect to the respective paths for the light rays 770, 710, 720 (e.g., red, green, and blue light rays) and at the suitable spatial location to receive the light modulated by the spatial light modulator 902 that forms respective red, green and blue images.

Although red, green, and blue color lights are used as examples, other color light may be employed. Accordingly, the one or more light emitters 904 may emit different color light and the one or more waveguides 906 may propagate different color light. Additionally, although three colors, red, green, and blue are described above as examples, more or less colors may be used. For example, if only two colors are used, possibly less light emitters 904 and less waveguides 906 may be employed.

In various designs, these systems and components are relatively compact to be disposed in a display device for a head mounted display. The set of stacked waveguides 660 may include a pupil expander such as described above. Additionally, the waveguides 670, 680, 690 may be optically transparent so that a viewer can see through the waveguides 670, 680, 690, for example, in the head mounted display.

Various designs of the waveguide based image source 910 may be used to deliver different color light (e.g., red, green, and blue) to the separate spatial locations where the respective in-coupling optical elements 700, 710, 720 are situated. For example, a single waveguide, e.g. waveguide 906, may receive white light and include an out-coupling optical element that has dispersion and that directs different color light (red, green, blue) into different directions. This may reduce the need to provide separate waveguides for transmission of different colors. In some embodiments, one or more waveguides each optically coupled to a different color LED (red, green, blue) may have out-coupling optical elements that direct the light in the respective waveguides into different directions. In some embodiments, a single waveguide may be coupled to a white LED and out-couple the light to one or more shutters with corresponding color filters to selectively pass different colors of light at different times. The shutters and filters are at different lateral positions so as to create color beams that are at different lateral positions. Alternatively, a single waveguide may be coupled to a white LED and out-couple the light to one or more dichroic beam splitters that split the different colors and produces different color beams that are at different lateral positions. Other designs are also possible.

Figure 10A:
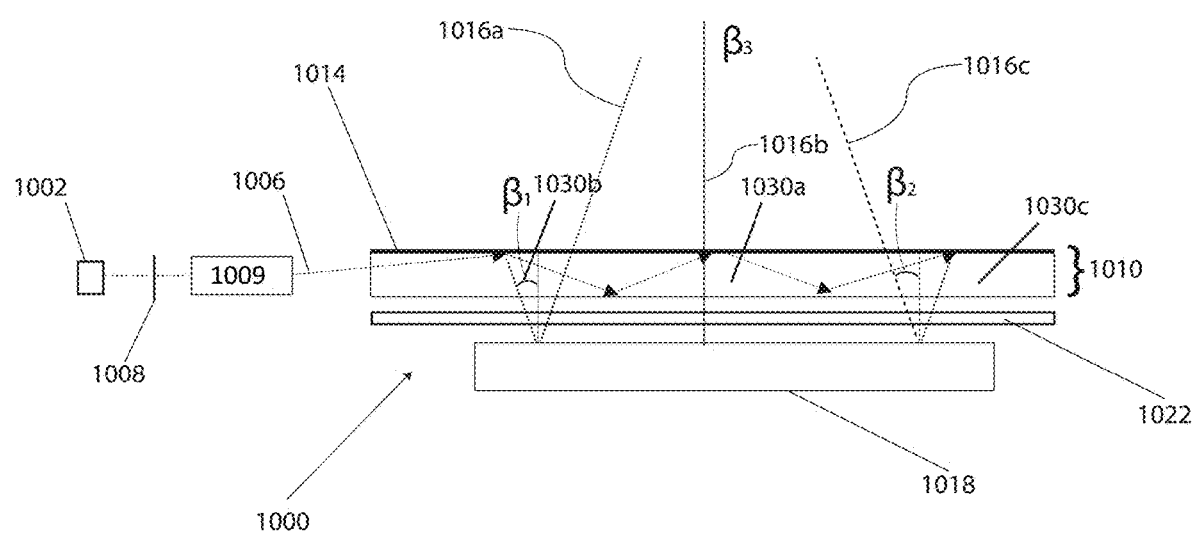
FIGS. 10A and 10B illustrate a waveguide-based image source comprising a single waveguide that may receive white light and includes an outcoupling optical element that has dispersion and that directs different color light (e.g., red, green, blue) into different directions.

FIG. 10A, for example, illustrates a display device 1000 that includes a single waveguide 1010 that is disposed with respect to a white light source (or emitter) 1002 to receive white light and includes an out-coupling optical element 1014 that has dispersion. The out-coupling optical element 1014 may include a grating or diffractive optical element that has dispersion. The dispersion may cause the out-coupling optical element 1014 to act differently for different wavelength light. The dispersion may cause the out-coupling optical element 1014 to redirect light of different colors at different angles. Accordingly, the dispersion may cause the out-coupling optical element 1014 to direct different color light (red, green, blue) into different directions and along different optical paths such that different color light is incident on different spatial locations.

In this example, the waveguide 1010 is configured to front-light the spatial light modulator 1018. The light source 1002 is disposed with respect to an edge of the waveguide 1010 to couple light into the waveguide 1010 through that edge. A coupling lens 1009 is included between the light source 1002 and the edge of the waveguide 1010 to assist in coupling light from the light source 1002 into the waveguide 1010. In some embodiments, the coupling lens 1009 may be excluded, and the light source 1002 may be positioned closer to the edge of the waveguide 1010 to couple light therein.

This light source 1002 may have a spectral distribution that includes spectral components corresponding to one or more different colors. The spectral distribution, for example, may include multiple spectral peaks that separately correspond to colored light such as red, green, or blue light or may otherwise include multiple spectral components that individually correspond to different colors. Accordingly, the light emitted from the light source 1002 may be polychromatic and possibly broad band, such as in the case of white light. The dispersion in the out-coupling element 1014 may be used to separate these different color spectral components. In the embodiment illustrated in FIG. 10A, the white light source 1002 may be a white LED.

The waveguide 1010 may include a sheet or film of material that is optically transmissive material to the wavelength of light output by the light source 1002, which may be visible light. In various designs, the waveguide 1010 is transparent to visible light. Accordingly, the waveguide 1010 may be employed in an eyepiece of an augmented reality head mounted display through which the viewer views the world. Light injected into the edge of the waveguide 1010 by the light source 1002 may be guided in the waveguide by TIR.

The out-coupling optical element 1014 may be included in or on the waveguide 1010, for example, on one or more major surfaces of the waveguide 1010. As illustrated in FIG. 10A, the out-coupling optical element 1014 is disposed on a side of the waveguide 1010 farther from the spatial light modulator 1018 although the out-coupling optical element 1014 may located on the side closest to the spatial light modulator 1018. The out-coupling optical element 1014 may include one or more diffractive, and/or holographic optical elements including diffractive or holographic features. The out-coupling optical element 1014 may include one or more gratings or holograms. Accordingly, the out-coupling optical element 1014 may include turning features such as diffractive features or microstructure configured to turn the light guided within the waveguide 1010 out of the waveguide 1010. The turning features, microstructure, and/or the out-coupling optical element 1014 may be reflective (although the turning features and/or the out-coupling optical element 1014 may operate in transmission, turning light that is transmitted through the out-coupling optical element 1014 in certain cases). In some embodiments, the out-coupling optical element 1014 may include surface features that are smaller or similar in size as the wavelength light input into the waveguide 1010 by the light source 1002. As discussed above, the out-coupling optical element 1014 may have dispersion that acts on different color light differently. In some cases, the out-coupling optical element 1014 may be a wavelength selective optical element, advantageously allowing preferential out-coupling of light of a particular wavelength or color, thus allowing control of the position and/or angle of out-coupled light based on wavelength or color. One or more such out-coupling optical elements 1014 may be included in the waveguide 1010.

Deflection may be caused by the turning features in the out-coupling optical element 1014 that are configured to turn or redirect light guided within the waveguide 1010. As illustrated by a ray of light 1006, the out-coupling optical element 1014 may be configured to reflect, deflect, and/or diffract the ray 1006 from the light source 1002 that is guided within the waveguide 1010 so that it propagates out of the waveguide 1010 toward the spatial light modulator 1018.

The spatial light modulator 1018 may include a spatial light modulator of various types, such as an liquid crystal on silicon (LCOS), digital light processing (DLP) device (e.g. a micromirror array), or an e-paper device. Other types of spatial light modulators may also be used. As appropriate, the spatial light modulator 1018 may be operated in reflection mode or in transmission mode and may be located in the path of the light ejected out of the waveguide 1010 as appropriate. In certain display devices, the spatial light modulator 1018 including a LCOS is operated in reflective mode. LCOS and various other spatial light modulators such as certain liquid crystal based spatial modulators modulate the polarization state of the light. For example, a pixel in the spatial light modulator 1018 may rotate or not rotate a polarization state, such as a linear polarization state, depending on the state of the pixel. Accordingly linearly polarized light having one state (e.g., an s state) may be selectively rotated (e.g., to a p state or vice versa) depending on the state of the pixel (e.g., on or off or vice versa). A analyzer or polarizer 1022 may be used to filter out light of one of the polarization states transforming the polarization modulation into intensity modulation that forms an image.

Accordingly, the display device 1000 may include a polarizer 1008 to cause the light from the light source 1002 that is injected into the waveguide 1010 to be polarized (e.g., in the s state). In some cases, the polarizer 1008 may be excluded, for example, if the light source 1002 outputs polarized light.

As discussed above, an analyzer 1022 may be included in an optical path between the spatial light modulator 1018 and the output of the image source (e.g. ray of light 1006). The analyzer 1022 may be particularly useful if the spatial light modulator 1018 modulates the polarization state of the light incident thereon. The analyzer 1022 may be configured to attenuate light of one polarization state in comparison to another polarization state. Accordingly, the analyzer 1022 may vary the intensity of the light based on the polarization state of the light, which may be dependent on the polarization modulation produced by the spatial light modulator 1018. In FIG. 10A, the analyzer 1022 is shown disposed between the spatial light modulator 1018 and the waveguide 1010 and the out-coupling optical element 1014 such that out-coupled light 1016*a*, 1016*b* 1016*c* passes through the analyzer 1022 onto the spatial light modulator 1018, which in the configuration shown in FIG. 10A operates in reflective mode, and passes again through the analyzer 1022 after reflection from the spatial light modulator 1018. Out-coupled intensity modulated light 1016*a*, 1016*b* 1016*c* may then propagate towards an in-coupling element for an eye-piece (not shown), such as in-coupling element 700, 710, 720 as discussed herein with reference to FIG. 9B.

FIG. 10A shows as an example, the ray of light 1006 output by the light source 1002 that pass through the polarizer 1008 to provide a defined polarization state, such as a linear polarization state such as s polarization (or horizontally polarized light). The ray of light 1006 may then be in-coupled into waveguide 1010 via the in-coupling optical element 1009. The ray of light 1006 then propagates within the waveguide 1010 by TIR off the major surfaces (e.g., top and bottom or forward and rearward surfaces) of the waveguide 1010 and is incident on the out-coupling optical element 1014 one or more times. The out-coupling optical element 1014 may be configured to deflect and redirect the ray of light 1006 guided within the waveguide 1010 at a more normal angle with respect to the major surfaces of the waveguide 1010 so as to reduce the effects of TIR such that light is not guided within the waveguide 1010 but instead exits therefrom. Moreover, out-coupling optical element 1014 may be configured to deflect and redirect this this light towards a spatial light modulator 1018.

The ray of light 1006 is a representative example of a ray of light 1006 from the light source 1002 that is guided within the waveguide 1010. For example, a cone of such rays may be emitted by the light source 1002 and propagated within the waveguide 1010. Similarly, each if the rays of out-coupled light 1016*a*, 1016*b* 1016*c* is a representative example of one ray out of a large number of rays that may be out-coupled over the length of out-coupling optical element 1014 at various locations on the waveguide 1010 and the out-coupling optical element 1014 and at various angles, depending on the angle of the ray incident thereon. The out-coupling optical element 1014 may be configured to out-couple the ray of light 1006 at multiple locations over the length of the waveguide 1010, thus creating many rays of out-coupled light, such as rays of out-coupled light 1016*a*, 1016*b* 1016*c*

The angle of the ray out-coupled from the waveguide 1010 may depend in part on the design of the out-coupling optical element 1014. In FIG. 10A, the angle between the out-coupled ray of light 1016 and a surface normal of waveguide 1010 is designated as angle β. In various cases, this angle 662 also corresponds to the angle at which the ray of light reflects from the spatial light modulator 1018 and propagates again through the waveguide 1010, and away from the image source 910. Based on the design of the display device 1000 and, for example, the out-coupling optical element 1014, this angle, β, may be affected by the wavelength of the ray of light 1016 (as well as the characteristics of out-coupling optical element 1014 such as the diffraction grating spacing for a diffraction grating). For example, for out-coupling optical elements including diffractive features, the out-coupling optical element 1014 may exhibit dispersion and the angle β may vary with wavelength. In FIG. 10A, this effect is shown by rays 1016*a*, 1016*b*, 1016*c*, which are intended to correspond to different colors such as red, green, and blue or blue, green, and red, and that are diffracted at different angles θ.

Accordingly, by appropriately controlling angle β for different wavelengths, out-coupled light of different wavelengths may be spatially separated. Light of multiple wavelength or colors (e.g., red, green, and blue) may thus be introduced into the waveguide 1010 and be directed along different paths (e.g., at different angles) to different spatial locations a distance from the waveguide 1010 and spatial light modulator 1018. The in-coupling optical elements 700, 710, 720 may be located at these respective spatial locations where the different wavelengths or colors (e.g., for red, green, and blue light) are located such that different colors are coupled into different in-coupling optical elements and different waveguides 670, 680, 690 in the set of stacked waveguides 660 in the eyepiece.

As discussed above, the out-coupled light 1016 corresponds to just a single ray of light emitted from the light source 1002, however, a cone of similar rays may be output by emitter. Likewise, a cone of rays for each color may be out-coupled from the waveguide 1010 using the out-coupling optical element 1014 and directed to the spatial light modulator 1018. These rays may be modulated by the spatial light modulator 1018 and may propagate away from imaging source 910.

Figure 10B:
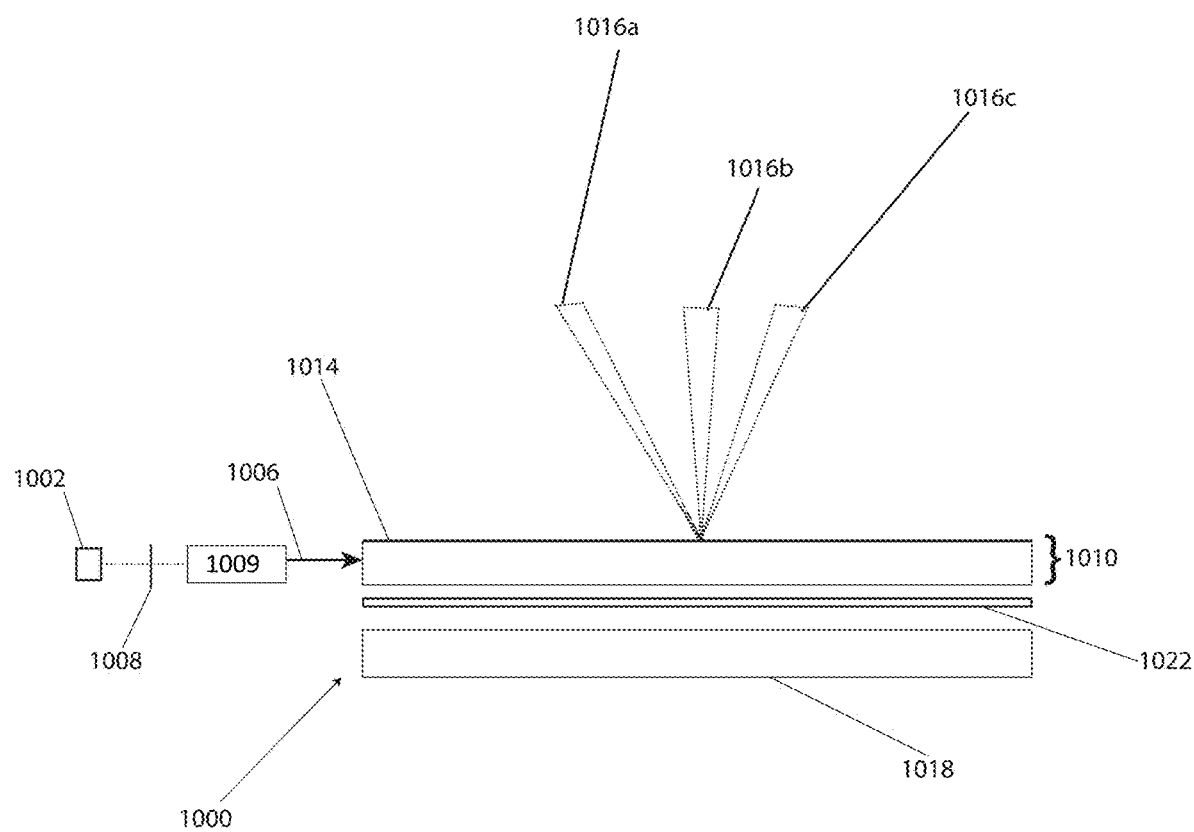

FIG. 10B shows one or more cones of light of different color propagating away from the imaging source 910. In various implementations, the light emitted by the light source 1002 will diverge and have a divergence angle. This light will propagate within the waveguide 1010 and be turned by the out-coupling optical element 1014, interact with the spatial light modulator 1018 and propagate therefrom, through the waveguide 1010 and the out-coupling optical element 1014, still diverging. As a result, FIG. 10B shows diverging light, for example, cones of light rays, 1016*a*, 1016*b*, and 1016*c*. The light source 1002 may output light including multiple spectral components (e.g., spectral peaks) associated with different colors. The light source 1002 may, for example, be a broad band light source such as a white LED (WLED) including red, green and blue spectral peaks. As a result of dispersion in the illumination system 900, for example, in the out-coupling optical element 1014, the different color light emitted by the light source 1002 exits the system as out-coupled cones of light 1016*a*, 1016*b* and 1016*c* that are directed away from the waveguide 1010 in different directions. For example, out-coupled light 1016*a* (e.g. red) may be propagating away from the waveguide 1010 along a first path directed at a first angle (e.g., centered about a positive angle with respect to the normal), whereas out-coupled light 1016*b* (e.g., green) may be propagating away from the waveguide 1010 along a second path directed at a second angle (e.g., centered about an angle normal to the waveguide), and out-coupled light 1016*c* may be propagating away from the waveguide 1010 along a third path directed at a third angle (e.g., centered about a negative angle with respect to the normal). This dispersive effect of the illumination system 900 introduced, for example, by using an appropriately designed out-coupling element 1014 may facilitate the spatial separation of various colors or wavelengths of the out-coupled light 1016*a*, 1016*b*, 1016*c*. This particular arrangement of colors and output angles is only an example and the color, order, and the relative or particular angles may be different.

Figure 11A:
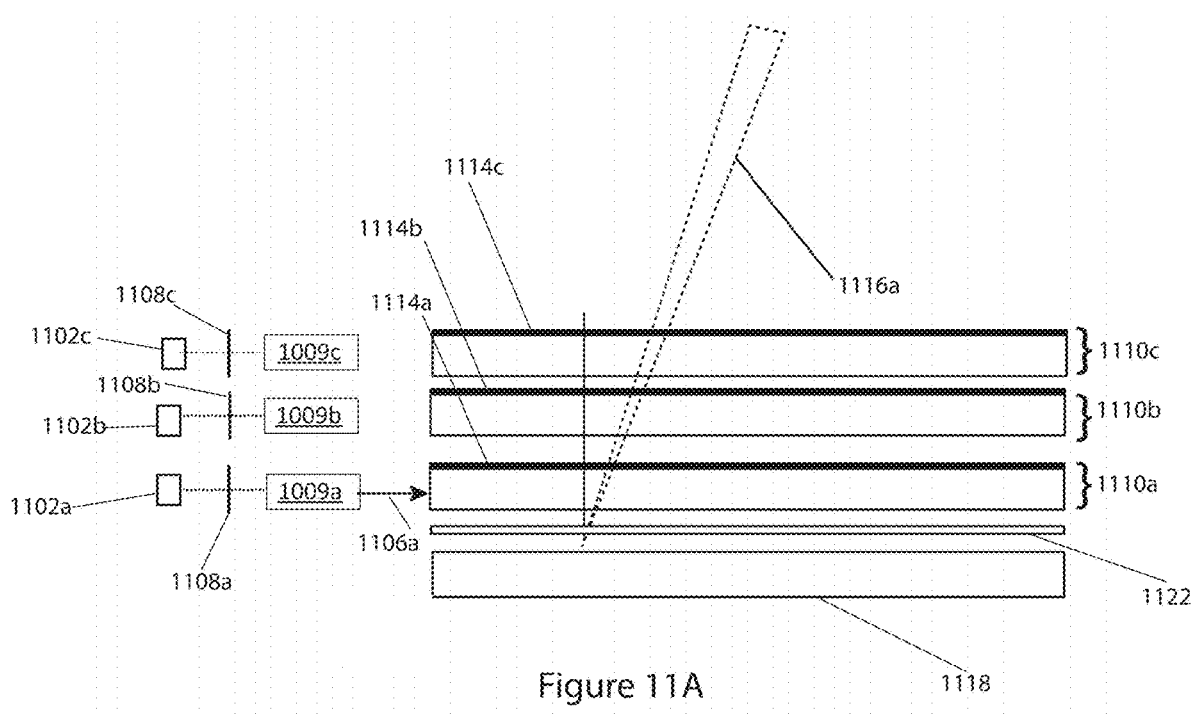
FIGS. 11A-11C illustrate a waveguide-based image source comprising a plurality of waveguides each optically coupled to a different color LED (e.g., red, green, blue) having outcoupling optical elements that direct the light in the respective waveguides into different directions.
Figure 11B:
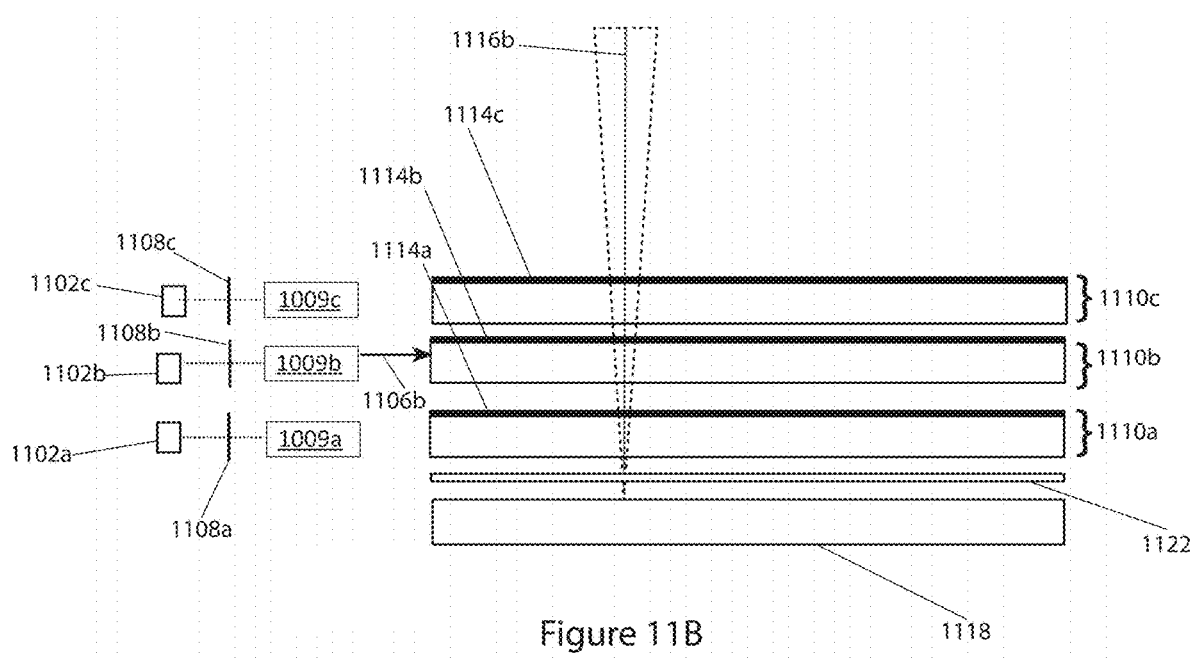
Figure 11C:
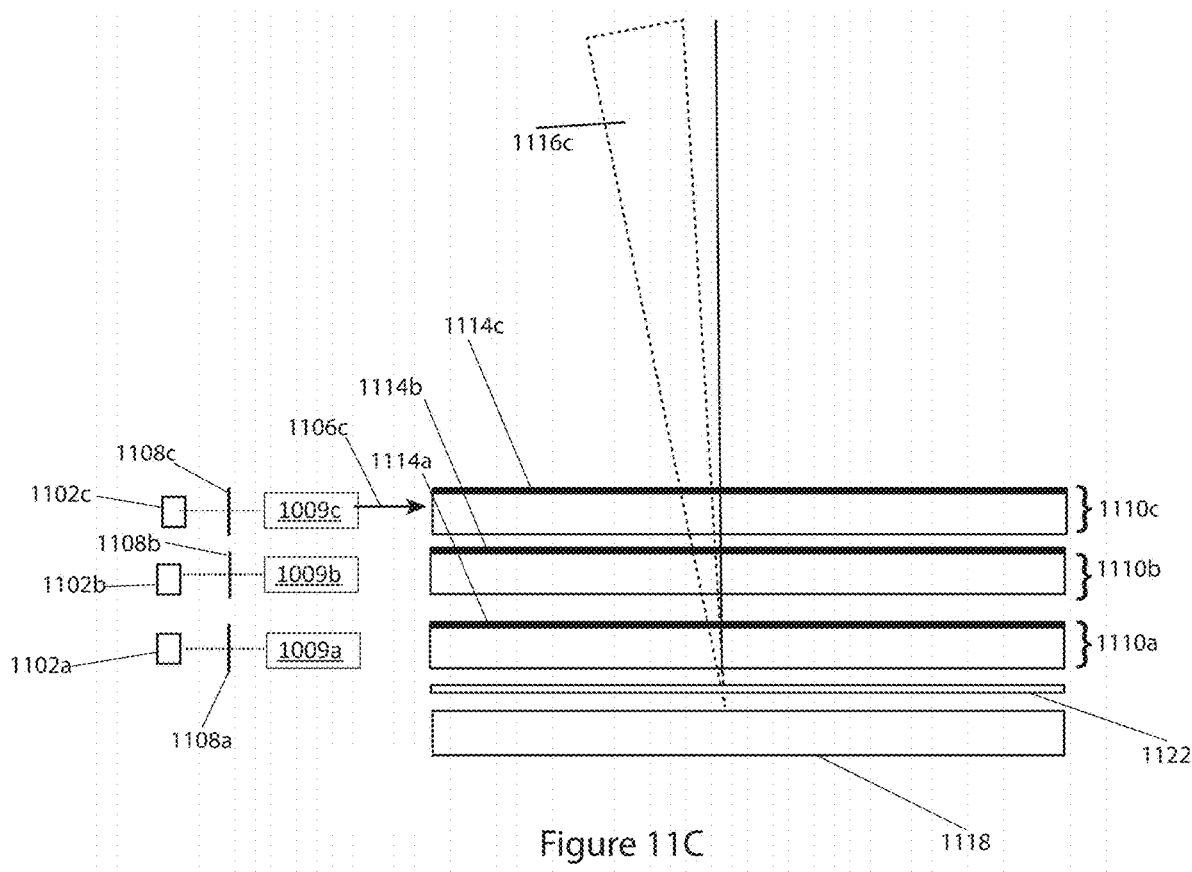

Another approach is to employ one or more waveguides 1010 each optically coupled to a different color emitter (e.g., a red LED, a green LED, and a blue LED) and including out-coupling optical elements 1014 that direct the light guided in the respective waveguides into different directions. FIGS. 11A-11C, for example, illustrates first, second, and third light sources 1102a, 1102b, 1102c optically coupled to respective, first, second, and third waveguides 1110a, 1110b, 1110c via respective first, second, and third in-coupling elements 1109a, 1109b, 1109c. Polarizers 1108a, 1108b, 1108c may be disposed in the beam path between the respective light sources 1102a, 1102b, 1102c and respective waveguide 1110a, 1110b, 1110c to provide a particular polarization such as the s-polarization state, and an analyzer 1122 may be disposed between first, second and third waveguides 1110a, 1110b, 1110c and spatial light modulator 1118. The multiple light sources 1102a, 1102b, 1102c may have different spectral profiles and output different color light such as red, green, and blue light. For example, the first light emitter 1102a may couple blue color light into the first waveguide 1110a, the second light emitter 1102b may couple green color light into the second waveguide 1110b and the third light emitter 1102c may couple red color light into the third waveguide 1110c. The first, second, and third waveguides 1110a, 1110b, 1110c include respective first, second, and third, out-coupling elements 1114a, 1114b, 1114c configured to direct light along respective first, second, and third optical paths to respective first, second, and third spatial locations. The first, second, and third out-coupling optical elements 1114a, 114b, 114c may include different diffraction gratings, holograms, diffractive optical elements, microstructure, or other structures or features that operate on light propagating at different angles in the different waveguides 1110a, 1110b, 1110c so as to direct the light into different directions. The out-coupling optical elements 1114a, 1114b, 1114c may be configured to reflect, deflect, and/or diffract the light rays from the respective light sources 1102a, 1102b, 1102c that are guided within the respective waveguides 1110a, 1110b, 1110c, based on polarization state of the light rays, so that the light rays propagate out of the waveguides 1110a, 1110b, 1110c toward a spatial light modulator 1118. The out-coupling optical elements 1114a, 1114b, and 1114c may be further configured to pass or otherwise transmit light rays from the spatial light modulator 1118, based on polarization state of the light rays, out of the image source 910. FIG. 11A shows out-coupled light 1116a corresponding to a first color 1106a (e.g., blue) from the first waveguide 1110a directed along the first direction/optical path. FIG. 11B shows out-coupled light 1116b corresponding to a second color 1106b (e.g., green) from the second waveguide 1110b directed along the second direction/optical path, and FIG. 11C shows out-coupled light 1116c corresponding to a third color 1106c (e.g., red) from the third waveguide 1110c directed along the third direction/ optical path. This configuration allows multiple waveguides 1110a, 1110b and 1110c to be stacked and to spatially separate the different wavelengths of out-coupled light. The respective angles of the cones of out-coupled light 1116a, 1116b and 1116c may be negative, zero, or positive; however, the angles, the order, and the colors may be different.

Figure 11D:
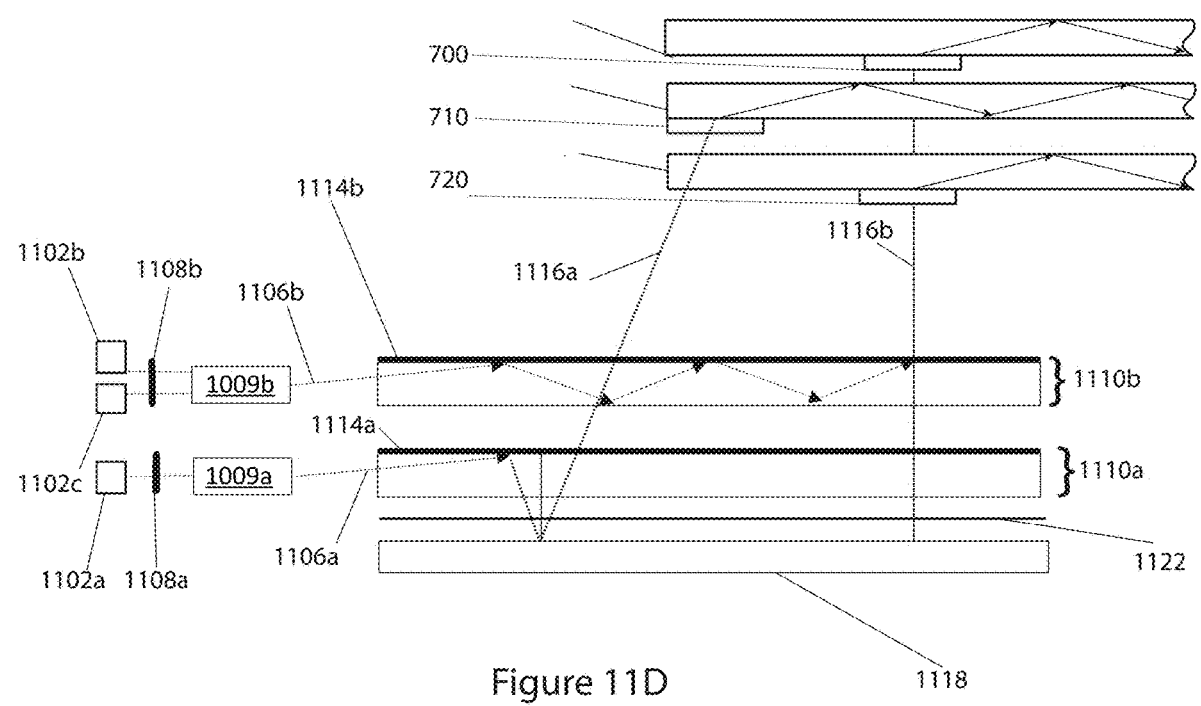
FIG. 11D shows a waveguide-based image source comprising three color light emitters and two waveguides where two of the colors from two emitters are combined into a single waveguide.

FIG. 11D shows another configuration, similar to the display device shown in FIGS. 11A-11C, however, two of the colors are combined into a single waveguide. In FIG. 11D, for example, first, second, and third light sources 1102a, 1102b, 1102c, are shown optically coupled into first and second waveguides 1110a, 1110b. In particular, the first light source 1102a outputting light of a first color is coupled into the first waveguide 1110a, and the second and third light sources 1102b and 1102c, which output second and third color light, respectively, are coupled to the second waveguide 1110b. The first and second waveguides 1110a, 1110b include first and second out-coupling elements 1114a, 1114b, respectively, configured to direct light along respective first and second optical paths to respective first and second spatial locations. The first and second out-coupling elements 1114a, 1114b may include different diffraction gratings, holograms, diffractive optical elements, microstructure, or other structures that operate on light propagating at different angles in the different waveguides so as to direct the light into different directions. The out-coupling optical elements 1114a, 1114b may be configured to reflect, deflect, and/or diffract the light rays from the light sources 1102a, 1102b, 1102c that are guided within the respective waveguides 1110a, 1110b, based on polarization state of the light rays, so that the light rays propagate out of the waveguides 1110a, 1110b toward the spatial light modulator 1118. The out-coupling optical elements 1114a, 1114b may be further configured to pass or otherwise transmit light rays from the spatial light modulator 1118, based on polarization state of the light rays, out of the image source 910.

FIG. 11D, for example, shows out-coupled light 1116b corresponding to the light having a different spectral distribution resulting from the combination of light from the second and third light sources 1102b, 1102c (e.g., the combination of red and blue light from red and blue emitters) ejected from the second waveguide being directed along the second direction/optical path. The out-coupled light 1116a corresponding to the first color (e.g., green) from the first waveguide 1110a can be directed to an in-coupling optical element 710 located at the first spatial location. The out-coupled light 1116b corresponding to the light having a different spectral distribution resulting from the combination of different color light from the second and third light sources 1102b, 1102c (e.g., the combination of red and blue light from red and blue light sources) ejected from the second waveguide 1110b can be directed to respective in-coupling optical elements 700 and 720 located at the second spatial location laterally displaced with respect to the first location and in-coupling optical element 710. The in-coupling optical element 720 that receives the light having a different spectral distribution resulting from the combination of light from the second and third light sources 1102b, 1102c (e.g., the combination of red and blue light from red and blue light sources) may include a dichroic element that directs light having one spectral profile in one direction and directs light having another spectral profile in a different direction. Likewise, light from the second light source 1102b may be separated from light from the third source 1102c. The dichroic element may direct the light of the second and third colors (e.g., red and blue light from the red and blue emitters) into different waveguides. In another configuration, in-coupling optical element 700 and 720 may be combined into a signal dichroic incoming optical element the couples light into one waveguide (e.g., waveguide 670) or another waveguide (e.g., one of waveguides 670, 690) based on the wavelength.

Figure 12A:
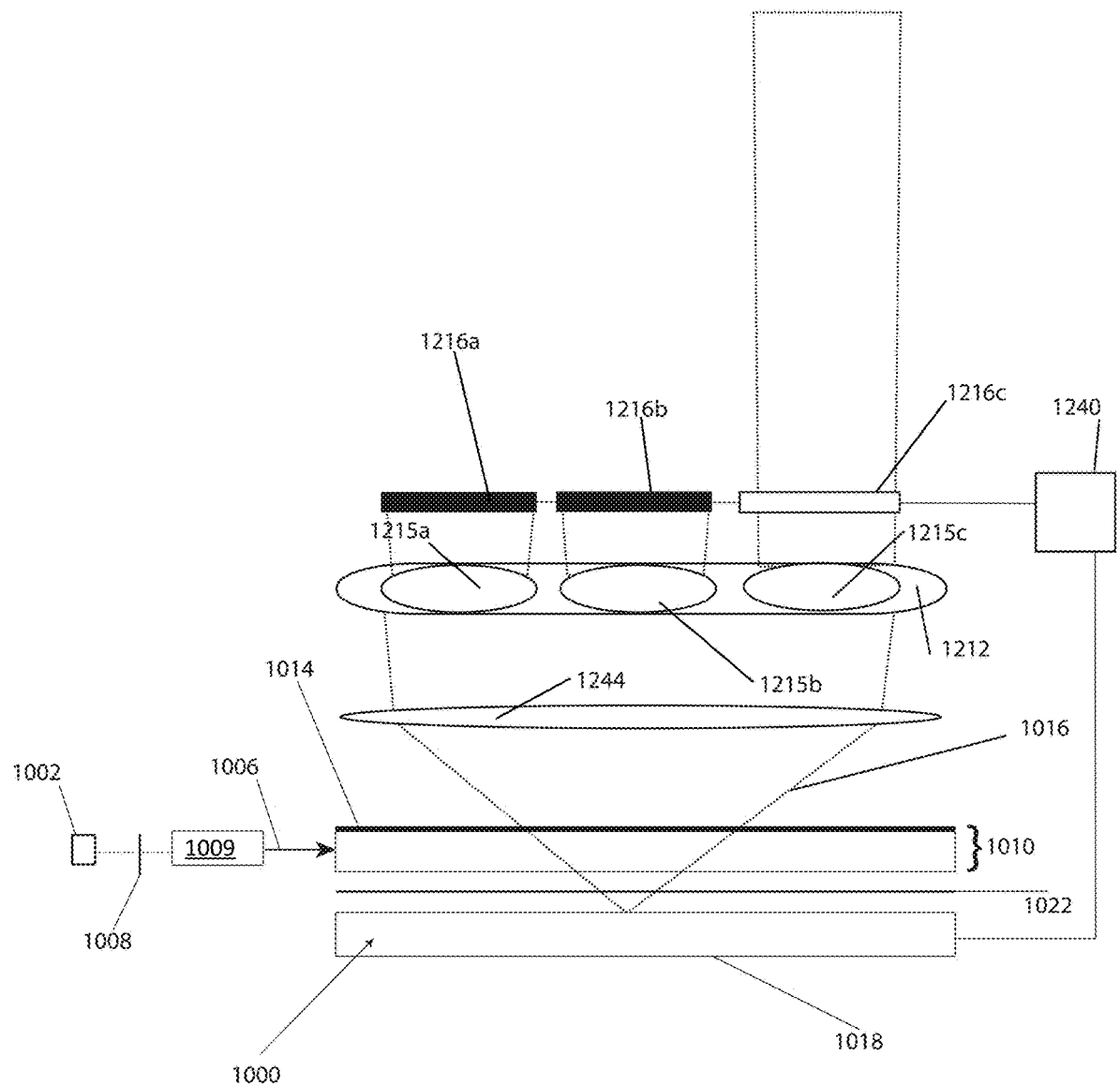
FIG. 12A illustrates a waveguide-based image source comprising a single waveguide that may be coupled to a white LED and outcouples the light to a plurality of shutters with corresponding color filters to selectively pass different colors of light at different times.

Other approaches to illuminating the spatial light modulator 1018 are possible. FIG. 12A illustrates another display device, like the display device in FIGS. 10A and 10B, wherein a single waveguide 1010 is coupled to a light source (e.g., a white LED) 1002 that emits one or more color components. Light from the light source 1002 is out-coupled from the waveguide 1010 onto a spatial light modulator 1018 by an out-coupling optical element 1014. After modulation, light is directed to one or more shutters with corresponding color filters to selectively pass different colors of light at different times.

FIG. 12A shows a shutter unit 1212 that includes one or more electronically controlled shutters 1216*a*, 1216*b* and 1216*c* and associated color filters 1215*a*, 1215*b*, 1215*c*. FIG. 12A shows, for example, first, second, and third shutters 1216*a*, 1216*b* and 1216*c*, aligned with corresponding first, second, and third color filters 1215*a*, 1215*b*, 1215*c*, forming respective first, second, and third channels, which may selectively transmit first, second, and third colors, respectively. The shutter unit 1212 may include, for example, a color-selective liquid crystal (LC) shutter unit. The filters may include a variety of filters including absorption filters and/or interference filters. Although three channels are shown in FIG. 12A, a display device 1000 may include more channels or less channels.

The shutters 1216*a*, 1216*b* and 1216*c* and filters 1215*a*, 1215*b*, 1215*c* are disposed with respect to the waveguide 1010 and the spatial light modulator 1018 so as to receive light 1016 output from the waveguide and modulated by the spatial light modulator 1018. FIG. 12A also shows imaging optics 1244 that projects light from the spatial light modulator 1018 onto the shutter unit 1212.

The shutter unit 1212 and the spatial light modulator 1018 may be in electrical communication with control electronics 1240, which may control the opening and closing of the shutters 1216*a*, 1216*b* and 1216*c*. The control electronics 1240, which may include a clock circuit which may synchronize the opening and closing of the shutters 1216*a*, 1216*b* and 1216*c* to the operation (e.g., refresh) of the spatial light modulator 1018.

The shutter unit 1212 may be operated in synchronization with the spatial light modulator 1018 so that at any given time, no more than one channel on the shutter unit 1212 is open. The time during which a channel on the shutter 1212 remains open may be referred to as dwell time. In various examples, the shutter unit 1212 may include three channels corresponding to a tricolor stimulus (e.g. red color filter 1215*a*, green color filter 1215*b* and blue color filter 1215*c*). For example, the spatial light modulator 1018 may be set to an output pattern corresponding to the red component of an image, while shutter unit 1212 opens the red channel and keeps the green channel and the blue channel closed, thus only permitting red light to pass. The spatial light modulator 1018 may correspondingly be set to an output pattern corresponding to the green component of an image, while simultaneously, shutter unit 1212 keeps red channel and blue channel closed and opens the green channel, thus only allowing green light to pass. The spatial light modulator 1018 may then be set to an output pattern corresponding to the blue component of an image, while shutter 1212 keeps green channel and red channel closed and opens blue channel, thus only allowing blue light to pass.

Figure 12B:
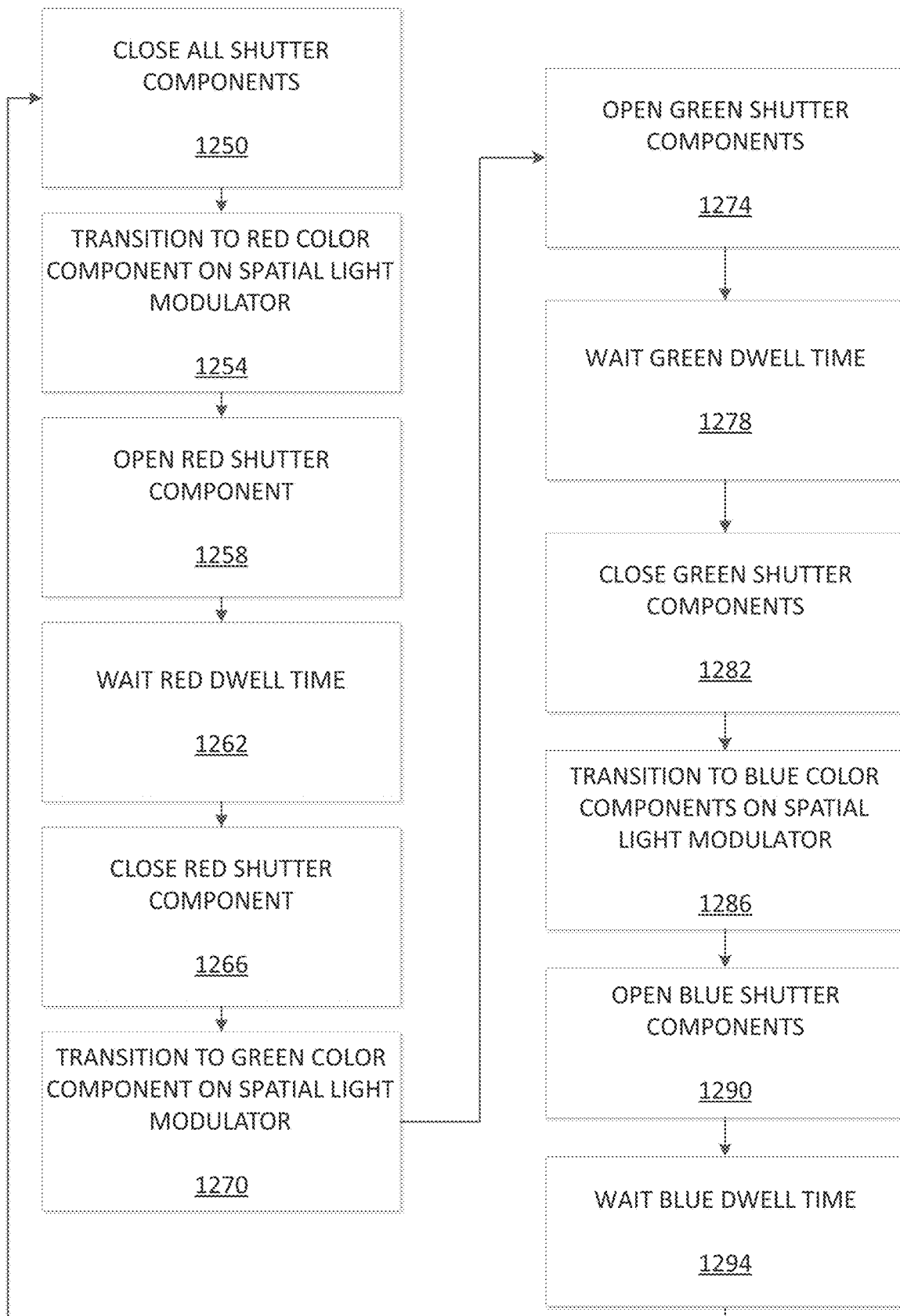
FIG. 12B is a flow chart that illustrates an example refresh process for a waveguide-based image source as shown in FIG. 12A comprising an shutter and a spatial light modulator.

FIG. 12B is a block diagram that illustrates an example refresh cycle of system of a display device including a shutter unit. In block 1250, the system begins a refresh by closing all shutter channels. After all shutter channels have been closed, the spatial light modulator 1018 transitions to displaying the modulation pattern for the first color component, e.g. red, in block 1254. When the spatial light modulator 1018 has finished the switching process and thus established the appropriate modulation pattern for the first color component, the red shutter channel is opened in block 1258, thus allowing red light to pass towards the eyepiece, however blocking green and blue light. In block 1262, the system remains in this state for the dwell time corresponding to the red color component. After the dwell time has elapsed, the system proceeds to block 1266, closing the red shutter channel. When the red shutter channel has been closed, the spatial light modulator 1018 transitions to the output a pattern corresponding to the second color component, e.g., green, in block 1270. When the spatial light modulator 1018 has finished its switching process, the green shutter channel is opened in block 1274, thus permitting green light to pass towards the eyepiece, however, blocking red and blue light. The system then remains in this state and waits in block 1278 until the dwell time for the green color component has elapsed. The system then proceeds to close the green shutter channel in block 1282. When the green shutter channel has been closed, the spatial light modulator 1018 transitions to the modulation pattern corresponding to the third color component, e.g., blue, in block 1286. After the spatial light modulator 1018 has finished its switching process, the blue shutter channel 1290 is opened in block 1290. Blue light is passed while red and green light are blocked. In block 1294, the system then remains in this state until the blue dwell time has elapsed. The system may then return to block 1250, starting the next refresh cycle. Other system configurations as well as process flows are possible.

Figure 13:
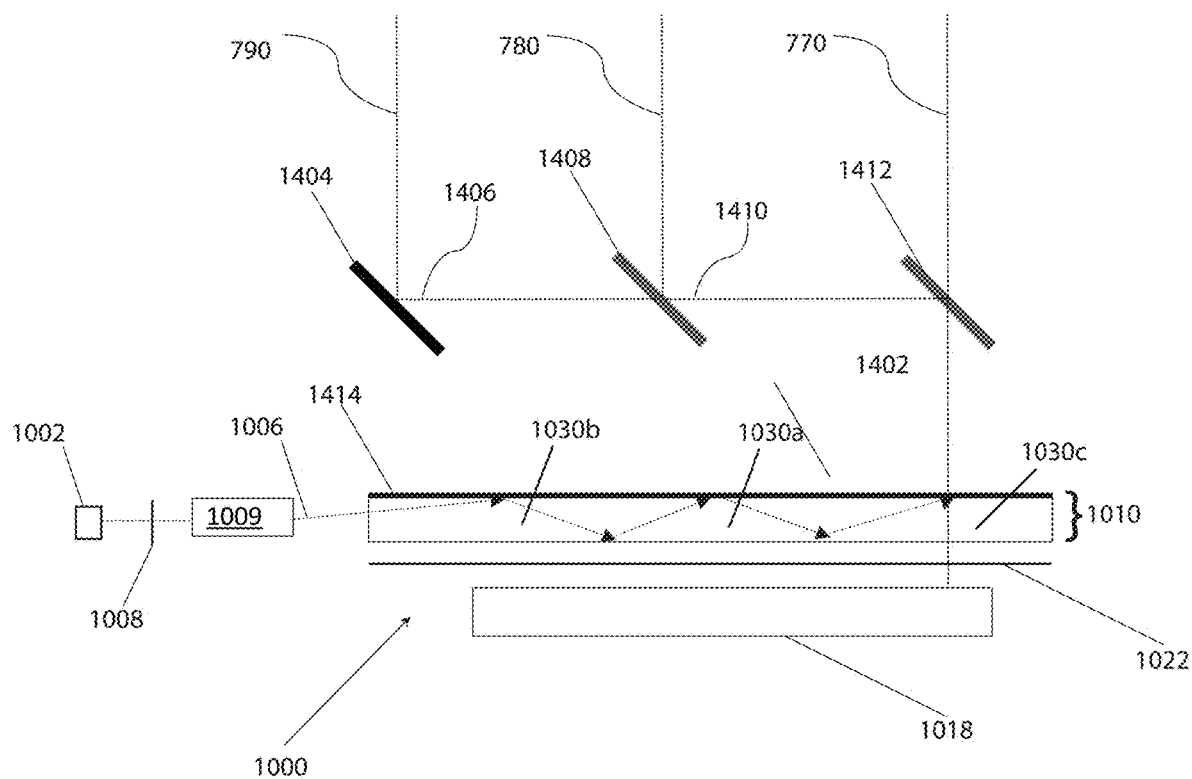
FIG. 13 illustrates a waveguide-based image source comprising single waveguide that may be coupled to a white LED and that outcouples the light to a plural of dichroic beamsplitters that split the different color and produces different color beams that are at different lateral positions.

FIG. 13 depicts another design for a display device 1000 that, like the display device 1000 shown in FIG. 12A, including a single waveguide 1010 that may be coupled to a light source 1002 that outputs light including one or more spectral components that correspond to multiple colors. Instead of out-coupling light from the waveguide 1010 onto a spatial light modulator 1018 and then to a shutter unit 1212, one or more dichroic beam splitters are used to split the different colors and produces different color beams that at different lateral positions.

The light source 1002 may include, for example, a white LED. The source 1002 is disposed with respect to the waveguide 1010 to couple light therein. The waveguide 1010 includes an out-coupling element 1414 that extracts light and cause the extracted light to be incident on a spatial light modulator 1018.

The display device 1000 further includes a beam splitter assembly disposed with respect to the waveguide 1010 and the spatial light modulator 1018 to receive light therefrom. The beam splitter assembly includes a first dichroic beam splitter 1412, a second dichroic beam splitter 1408, and a third reflective surface 1404. The beam splitter assembly 1402 is configured to separate out individual color components. For example, if the incident beam includes first, second and third colors, e.g., red, green and blue, the first beam splitter 1412 may include a dichroic reflector that transmits the first color and reflects the second and third colors. The second beam splitter 1408 may also include a dichroic reflector that reflects the second the color and transmits the third color. The reflective surface 1404 may redirect the third remaining color such that the first, second, and third color beams 770, 780, 790 are directed toward in-coupling optical elements 700, 710, and 720, respectively.

For example, as shown in FIG. 13, a ray of light 1006 from the broad band light source 1002, which may include a white LED, may be coupled into the waveguide 1010 and out-coupled by the out-coupling element 1414 towards a spatial light modulator 1018. The out-coupling element 1414 may be configured to reduce dispersion in the out-coupled beam 1402. After being reflected from spatial light modulator 1018, the modulated beam is directed towards the first beam splitter 1412 that selectively passes or directs light of a specific color (e.g. blue light) towards a specific optical path, while reflecting or directing light not of the specific color along another optical path (e.g. the remaining red and green components in out-coupled beam 1402). The beam transmitted through the first beam splitter 1412 may form light ray 770 and may be directed towards an in-coupling optical element, such as in-coupling element 700, for another waveguide 670 in the eyepiece element, as discussed with reference to FIG. 7. The reflected beam 1410 travels towards the second beam splitter 1408 that selectively directs or reflect light of another specific wavelength or color (e.g. green light) along a specific optical path, while transmitting or directing light not of the specific wavelength (e.g. the remaining blue component). The beam reflected from the second beam splitter 1408 may form light ray 780 and may be directed towards an in-coupling optical element, such as in-coupling element 710, for another waveguide 680 in the eyepiece element, as discussed with reference to FIG. 7. The beam 1406 transmitted though beam splitter 1408 propagates towards the reflective surface 1404, where it may be reflected. The reflected beam 790 may then travel towards an in-coupling optical element 720 for another waveguide 690 in the eyepiece element, such as in-coupling optical element 720, as discussed with reference to FIG. 7. Other configurations are possible. For example, more or less beam splitters may be included in the beam splitter assembly and the arrangement may be different.

Although illumination systems may be described above as waveguide based and comprising one or more waveguides, other types of light turning optical elements may be employed instead of a waveguide. Such light turning optical elements may include turning features to eject the light out of the light turning optical element, for example, onto the spatial light modulator. Accordingly, in any of the examples described herein as well as any of the claims below, any reference to waveguide may be replaced with light turning optical element instead of a waveguide. Such a light turning optical element may comprise, for example, a polarizing beamsplitter such as a polarizing beamsplitting prism.

Additional Variations

The various devices, system, configurations, methods, and approaches above can be implemented in a wide variety of ways. For example different types of outcoupling optical elements may be employed. In various implementations, for example, the outcoupling optical element may include a volume phase grating or hologram. Reflective volume grating, for example, exhibit strong directional diffraction as well as high coupling efficiency (e.g., up to about 100% efficiency). Also, different schemes for introducing light into the waveguide are possible.

Figure 14A:
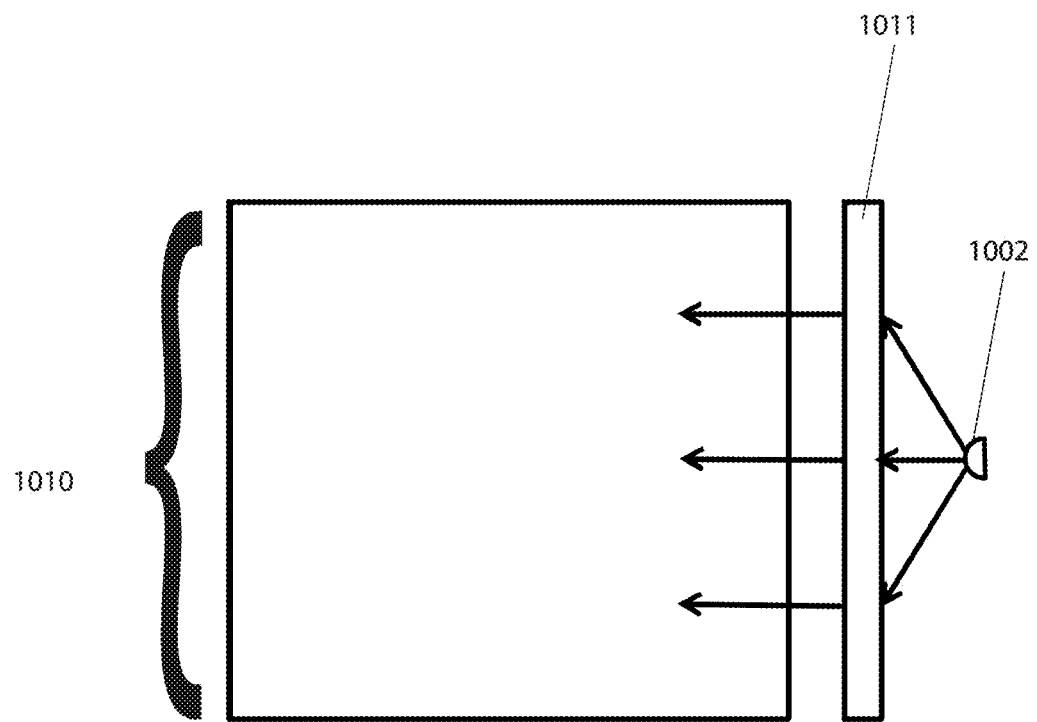
FIGS. 14A and 14B illustrates a waveguide-based image source comprising a waveguide illuminated by a point light source and a line light source, respectively.
Figure 14B:
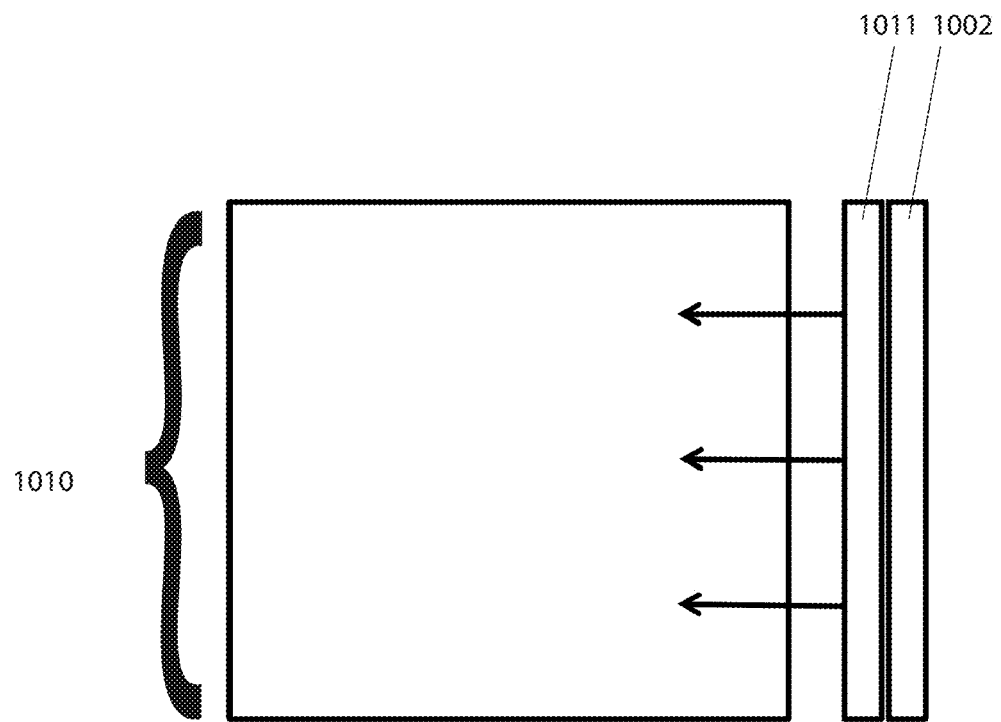

FIGS. 14A and 14B illustrate different configurations for providing light from a light source 1002 to a waveguides 1010 for front-lighting a spatial light modulator. In FIG. 14A, the light source 1002 is an approximately "point" light source (e.g., an LED), wherein, a least to a reasonable approximation for the application, all rays diverge substantially from a single point. In FIG. 14B, the light source 1002 is an "extended" light source that substantially extends along at least one spatial dimension, for example, as illustrated, along the length of a side of the waveguide 1010. The light source 1002 may be a line light source or area light source or part thereof. For example, the light source 1002 may include a linear arrangement of LEDs, for example, micro-LEDs, which may have microlens arrays for beam shaping. In some embodiments, light source 1002 may extend over the entire cross-section of the interface between waveguide 1010 and the surrounding medium, or the light source 1002 may extend over 90%, 80%, 70%, 60%, 50%, 40%, 30% or less than 30% of the cross-sectional area of the side of the waveguide 1010 in which light from the light source 1002 is injected.

In some embodiments, light-coupling optics 1011 may be disposed between the light source 1002 and the waveguide 1010 and may be employed to facilitate coupling of light from the light source 1002 into the waveguide 1010. The waveguide 1010 may include a thin optical transparent slab (e.g., glass or plastic) having for example a thickness ranging from 0.1 mm to 5 mm.

Figure 14C:
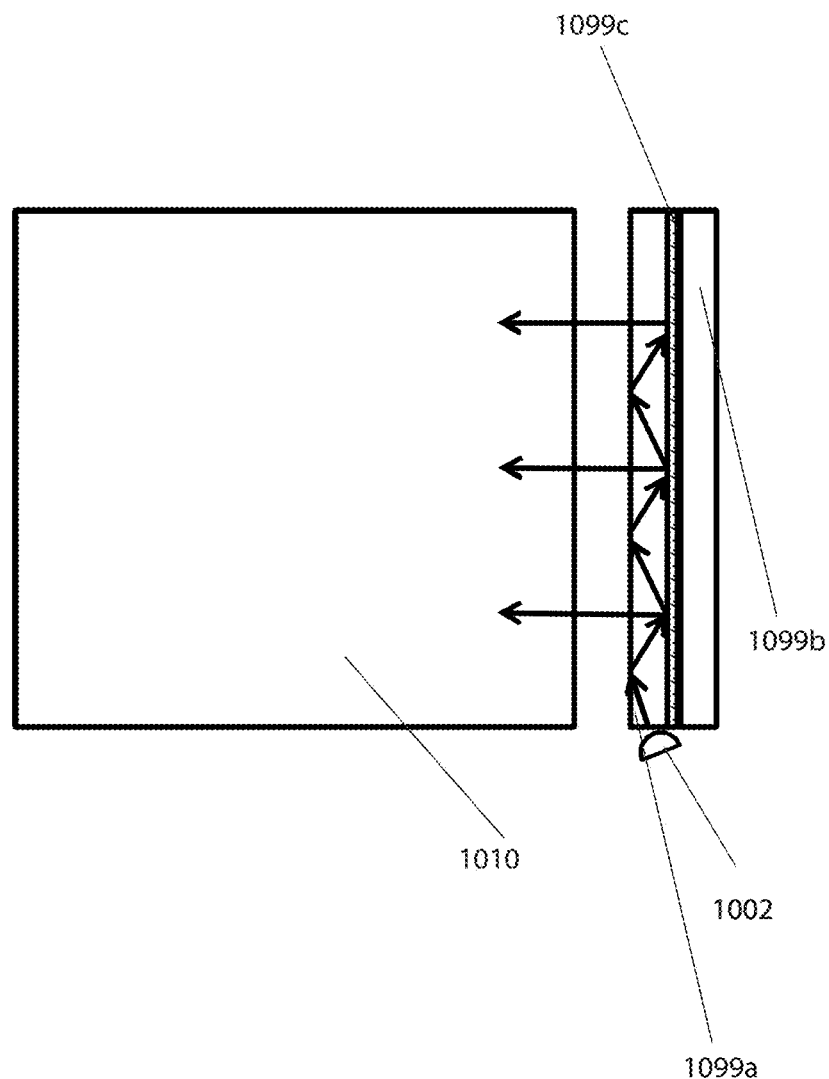
FIG. 14C-14E illustrate additional arrangements for coupling light into a waveguide.
Figure 14D:
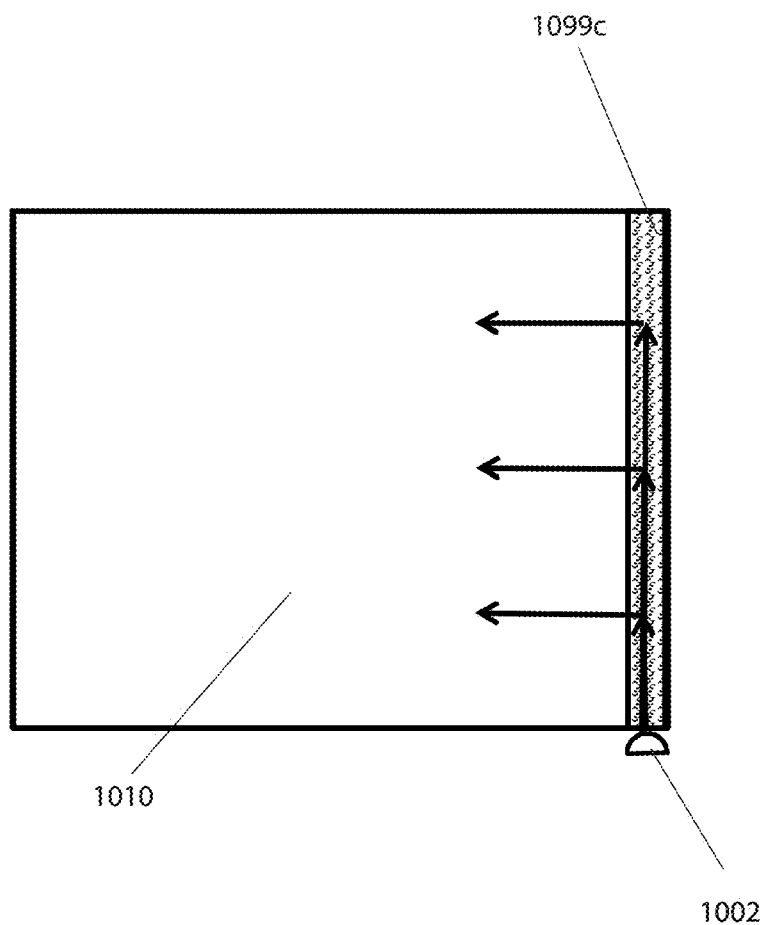
Figure 14E:
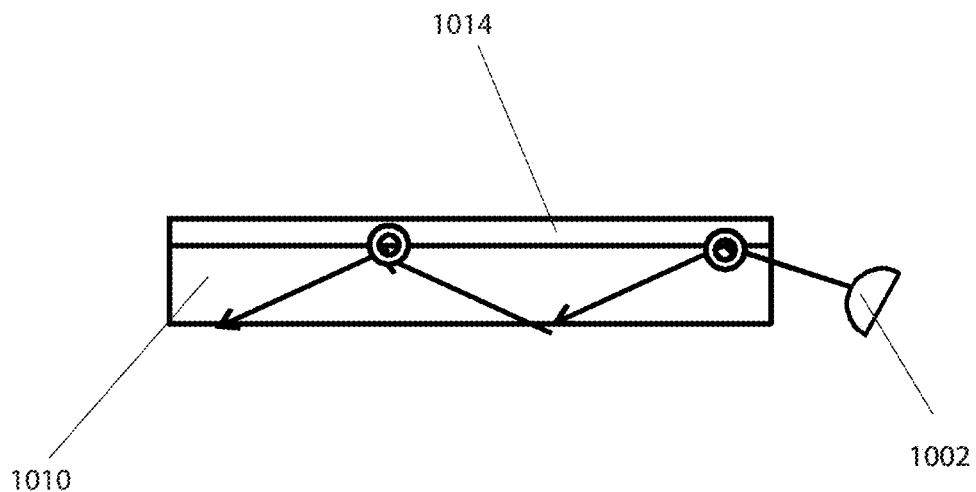

FIGS. 14C-14E illustrate arrangements for coupling light from a light source 1022 into a waveguide 1010, according to some embodiments. In particular, FIGS. 14C-14E depict waveguides 1010 for front-lighting a spatial light modulator (SLM) 1018 having a side light distributor for coupling light from a light source 1002 into the waveguides 1010. FIG. 14C illustrates an arrangement wherein a separate side light distributor including a light guide 1099*a* directs light into the waveguide 1010. An outcoupling optical element such as a grating is disposed in or on the light guide 1099*a* and is configured to redirect the light propagating within the light guide 1099*a* such that the light exits the light guide 1099*a*. An optional reflective element 1099*b* may be disposed with respect to the light guide 1099*a* and the grating to reflect light toward the waveguide 1010. Accordingly, the light emitted from light source 1002 is injected into a light guide 1099*a* and directed out of the light guide into waveguide 1010 for front lighting a SLM 1018.

FIG. 14D illustrates a waveguide 1010 having a side light distributor. At one end of the waveguide 1010, side light distributor including a turning element is provided. This turning element rotates the propagation of a beam of light from the light source 1002 that is coupled into an edge of the waveguide 1010. As illustrated, light from the light source 1002 propagates within the waveguide 1010 along an edge or side thereof. The turning element rotates this beam in some implementations 90° away from the side of the waveguide 1010 and further into the waveguide 1010. The turning element may, for example, include a diffraction grating. In some implementations, the diffraction grating may have a grating vector that is 45° with respect to the beam propagation direction along the side of the waveguide 1010. FIG. 14E shows a side cross-sectional view of the side light distributor. Light from the light source 1002 propagates within the waveguide 1010, for example, via total internal reflection form top and bottom surfaces of the waveguide 1010. Light incident on the turning element including, for example, the diffraction grating is turned, possible about 90° from the beam propagation direction. This redirection of the light is illustrated in FIG. 14E as light coming out of the paper. Other configurations are possible.

An outcoupling optical element 1014 may be used to couple light propagating within the waveguide 1010 out of the waveguide 1010 toward the SLM 1018. The light may propagate within the waveguide 1010 via total internal reflection. When the light interacts with the outcoupling optical element 1014, which may include, for example, a diffraction grating on a surface of the waveguide 1010, light is coupled out of the waveguide 1010 toward the SLM 1018. This grating may include a volume phase grating. Similarly, volume phase holograms or other volume diffractive optical elements may be employed in various implementations.

Figure 15A:
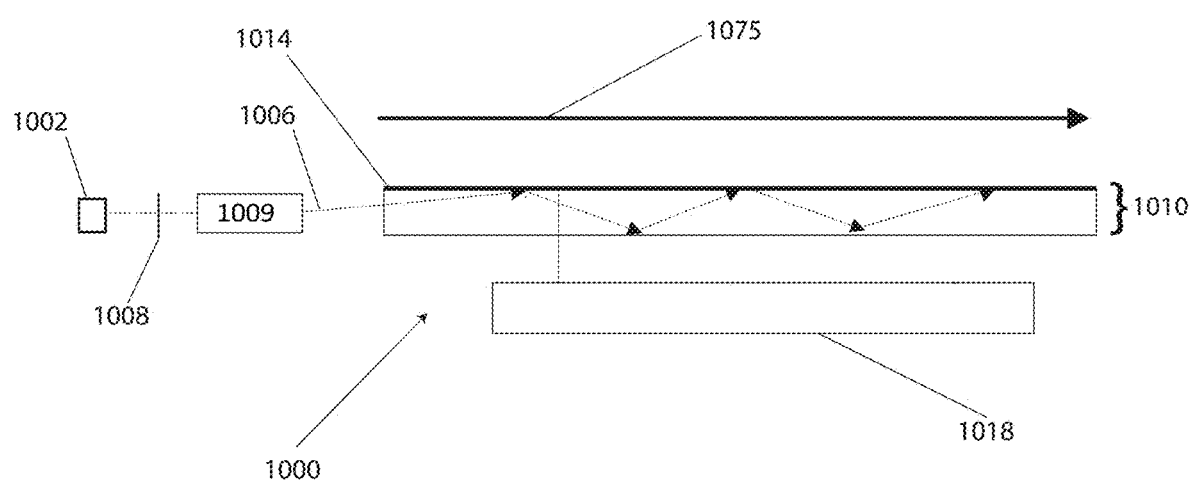
FIG. 15A illustrates a waveguide-based image source comprising a waveguide and an outcoupling optical element comprising volume phase diffractive element.

FIG. 15A shows a cross section of a waveguide 1010 having an outcoupling optical element 1014 including a volume phase grating thereon, according to some embodiments. This volume phase grating includes a reflective volume phase grating. Accordingly light diffracted by the reflective volume phase grating is diffracted and reflected toward the SLM 1018 for providing illumination thereto.

In various implementations, the outcoupling optical element 1014 may have a gradient in coupling efficiency (e.g., grating efficiency or diffraction efficiency) that increases with distance away from the light source 1002. This gradient is represented by an arrow 1075 in FIG. 15A. As light is coupled out of the waveguide 1010, the light within the waveguide 1010 is depleted. By increasing the coupling efficiency at locations farther away from the light source, this depletion in light within the waveguide 1010 can be offset. Accordingly, relatively lower coupling efficiency is provided closer to the light source 1002, while higher coupling efficiency is provided farther from the light source 1002. A more uniform distribution of light can therefore be provided across the SLM 1018. Accordingly, the coupling efficiency at different locations across the outcoupling optical element 1014 can be optimized or modified to increase uniformity in light distribution across the SLM 1018.

In some implementations, the outcoupling optical element 1014 includes a grating wherein the grating has a variation, for example, a gradient, in pitch. For example, the grating pitch may increase with distance away from the light source 1002. This variation in pitch will alter the angles at which light is coupled out based on the location on the waveguide 1010 and grating where the light is coupled out. Areas of the grating of the outcoupling optical element 1014 closer to the light source 1002 may couple out light at lower angles while areas farther from the light source 1002, (e.g., at the other the end of the waveguide 1010) couple out light at high angles; the pitch may thus decrease along the direction indicated by arrow 1075 Using such a gradient pitch with high coupling efficiency, the illumination beam can be shaped while it propagates in the waveguide 1010.

Figure 15B:
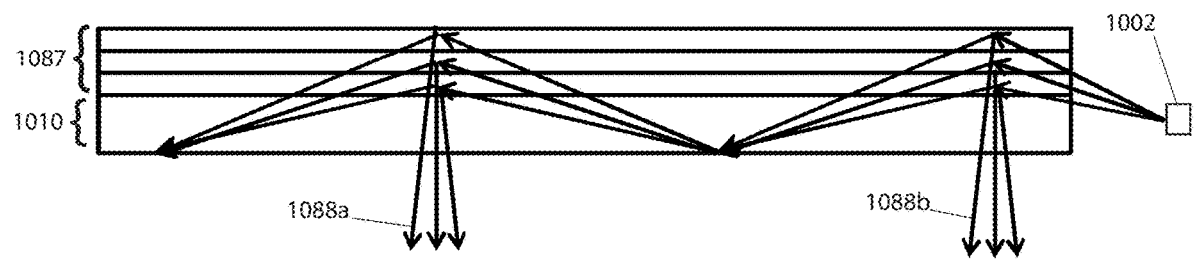
FIG. 15B illustrates waveguide-based light distribution device comprising a stack of volume phase grating (VPG) diffractive elements for different colors.

Since volume phase gratings may exhibit narrow spectral and angular properties, one or more volume phase gratings or stack of volume phase gratings may be used in various embodiments. FIG. 15B illustrates waveguide-based light distribution device with a waveguide 1010 and a stack 1087 of volume phase grating (VPG) diffractive elements for coupling light out of the waveguide 1010. The stack 1087 may include various volume phase grating diffractive elements configured to diffract light having different wavelengths. Moreover, the stack 1087 may include various VPG diffractive elements configured to diffract light having different colors. For example, the stack 1087 may include multiple (e.g. three) volume phase gratings, different gratings associated with wavelengths corresponding to different colors, respectively (e.g., red, green and blue). Light may be outcoupled at different locations at the stack 1087, as exemplified in the drawing by a first outcoupled cone 1088a and a second outcoupled cone 1088b originating from different locations in stack 1087.

Figure 15C:
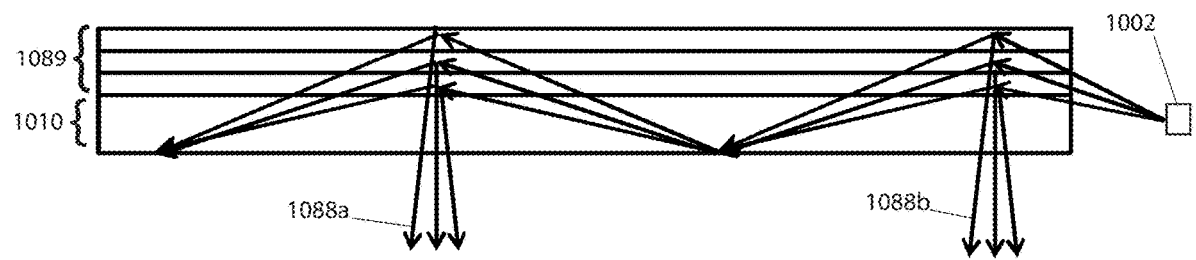
FIG. 15C illustrates waveguide-based light distribution device comprising a stack of volume phase grating (VPG) diffractive elements for different angles.

Alternatively or additionally, as illustrated in FIG. 15C, the stack 1087 may include multiple volume phase gratings for the same color, but that diffract light at different angles. For example, the stack 1087 may include a first volume phase grating associated with a wavelength corresponding to the color red, a second volume phase grating associated with the same or another wavelength corresponding to the color green, and a third volume phase grating associated with the same or yet another wavelength corresponding to the color blue. However, the different gratings in the stack 1087 may diffract the light such that the light is outcoupled at a different angle. Since volume phase gratings may exhibit narrow angular properties, different gratings in the stack may be used for different angles. Light may be outcoupled at different locations at the stack 1087, as exemplified in the drawing by a first outcoupled cone 1088a and a second outcoupled cone 1088b originating from different locations in stack 1087.

Figure 16:
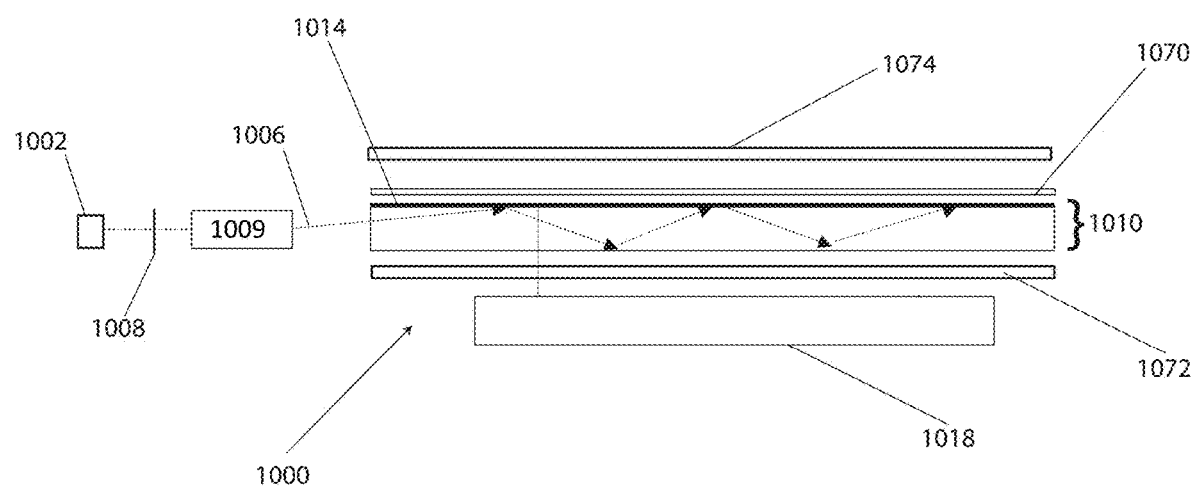
FIG. 16 illustrates a waveguide-based image source comprising a waveguide and an outcoupling optical element comprising a cholesteric liquid crystal grating (CLCG).

FIG. 16 illustrates a side view of a waveguide 1010, wherein a cholesteric liquid crystal grating (CLCG) 1070 is used for outcoupling light out of waveguide 1010. A CLCG 1070 can be formed using cholesteric liquid crystal that diffracts polarized light.

In some implementations, the CLCG 1070 diffracts circularly polarized light and the SLM 1018 (e.g., a liquid crystal spatial light modulator array) operates on linear polarized light. In such implementations, retarders may be employed to convert the circular polarized light into linear polarized light and vice versa. A first quarter-wave retarder 1072 may, for example, be disposed between waveguide 1010 and the SLM 1018, and a second quarter-wave retarder 1074 may be disposed on the opposite side of the waveguide 1010. In some embodiments, light may be outcoupled by the CLCG 1070 from the waveguide 1010 in the direction of the SLM 1018 with circular (e.g. right-hand circular) polarization. The first quarter-wave retarder 1072 may rotate the polarization to linear (e.g. linear vertical) polarization. Accordingly, in some embodiments where the SLM 1018 operates on linearly polarized light (such as a liquid crystal spatial light modulator), use of the CLCG 1070 and the first quarter wave retarder 1072 may reduce the need for a linear polarizer, as linear polarized light is output from the first quarter wave retarder 1072. Upon being reflected and imparted with modulation by the SLM 1018, the linear polarized light passes again through the first quarter-wave retarder 1072, again assuming circular (e.g. left hand circular) polarization. Upon passing through second quarter-wave retarder 1074, the circular polarized light may be converted back to linear (e.g. linear horizontal) polarization. Other configurations are possible.

As discussed above with regard to FIG. 15A and the outcoupling optical elements 1014 including volume phase gratings, the CLCG 1070 may have a gradient in coupling efficiency and/or pitch. The CLCG 1070 may, for example, be configured to have a high diffractive efficiency further away from the light source 1002, and a lower diffractive efficiency closer to the light source 1002. As discussed, the amount of light within the waveguide 1010 may decrease with increasing distance from the light source 1002. By appropriately choosing the coupling efficiency profile of the CLCG 1070 along its length, the effect of decreasing light within the waveguide 1010 may be at least partially compensated by an increase in the outcoupling efficiency of the CLCG 1070. This may allow for a more homogenous intensity of outcoupled light across the length of the waveguide 1010. Similarly, the pitch may be varied as discussed with regard to FIG. 15A. The pitch may, for example, be made small closer to the light source 1002 and larger farther from the light source 1002. Other configurations are possible.

Additionally, since the CLCG 1070 may exhibit narrow spectral and angular properties, one or more volume phase gratings or stack of volume phase gratings may be used in various embodiments. For example, as illustrated in FIG. 15B, the waveguide-based light distribution device can include a stack 1087 of cholesteric liquid crystal diffractive elements for coupling light out of the waveguide 1010. The stack 1087 may include various cholesteric liquid diffractive elements associated with different wavelength. Moreover, the stack 1087 may include various cholesteric liquid crystal diffractive elements configured to diffract light having different colors. For example, the stack 1087 may include multiple (e.g. three) volume phase gratings, different gratings associated with wavelengths corresponding to different colors, respectively (e.g., red, green and blue). The narrow or modest bandwidth enables light to be outcoupled with the same angle for different colors as individual color layers can be designed for each color.

The different variations described above can be used with any of the other devices, systems, configurations, method, and approaches discussed above. Still other variations are possible.

Figure 17A:
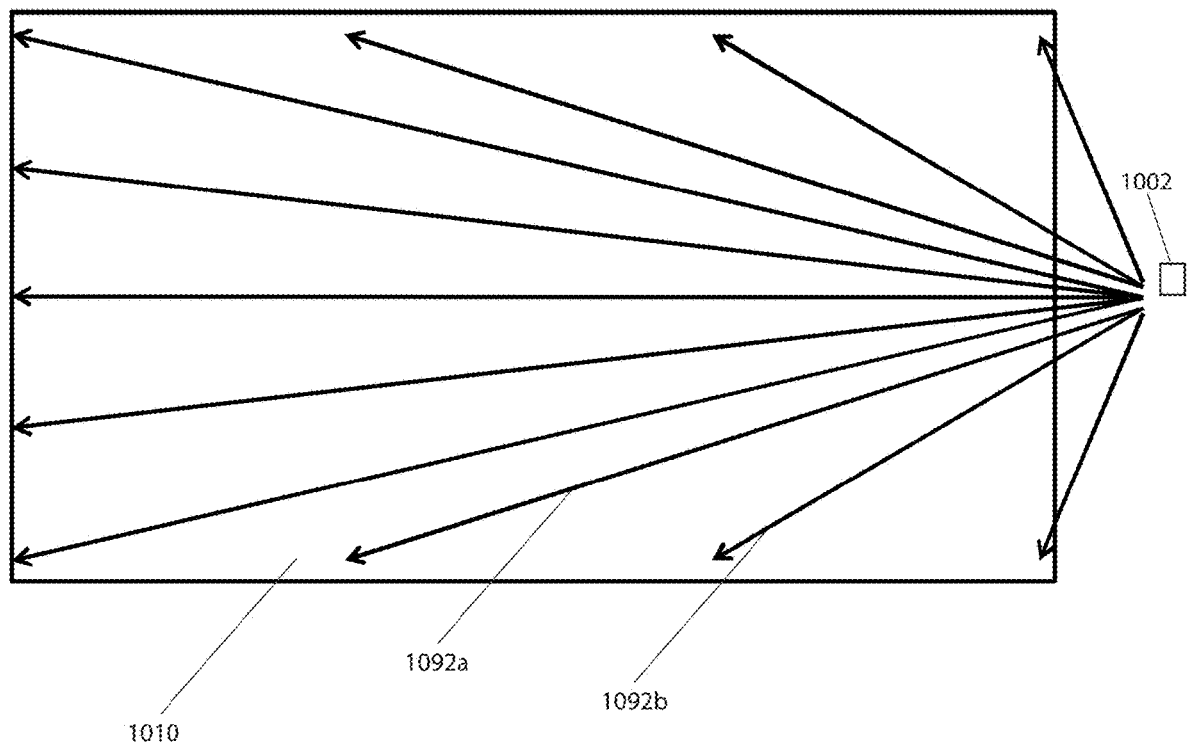
FIGS. 17A and 17B illustrate a waveguide-based light distribution device that may be configured to utilize off-axis illumination.
Figure 17B:
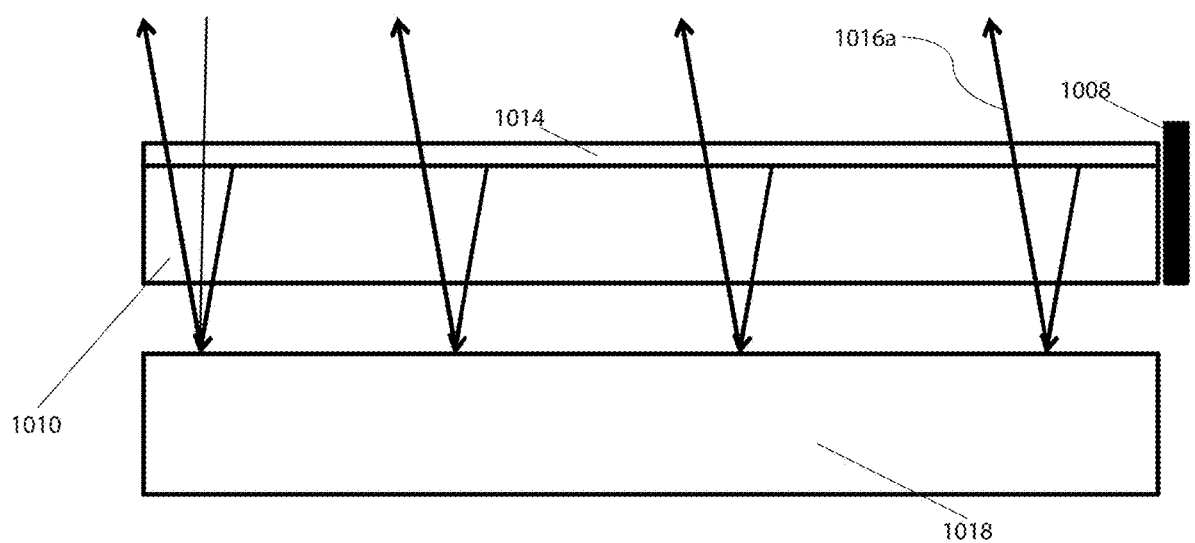

For example, efficient coupling of a source like an LED with a narrow angle cone of emission may involve some volume to fit optics for beam shaping. FIG. 17A illustrates a design with source illumination that is distributed across a SLM array such that coupling optics can be more efficient and compact as the coupling optics need to shape the beam to cover a SLM array area rather than a narrow angle cone. In some embodiments, as illustrate in FIG. 17B, light is coupled out from the waveguide 1010 when it interacts with the outcoupling optical element 1014 rather than propagating via total internal reflection in the waveguide 1010. Either volume phase grating or cholesteric liquid crystal gratings can be used. In some embodiments, both volume phase grating and cholesteric liquid crystal gratings can exhibit 100% efficiency.

Figure 18:
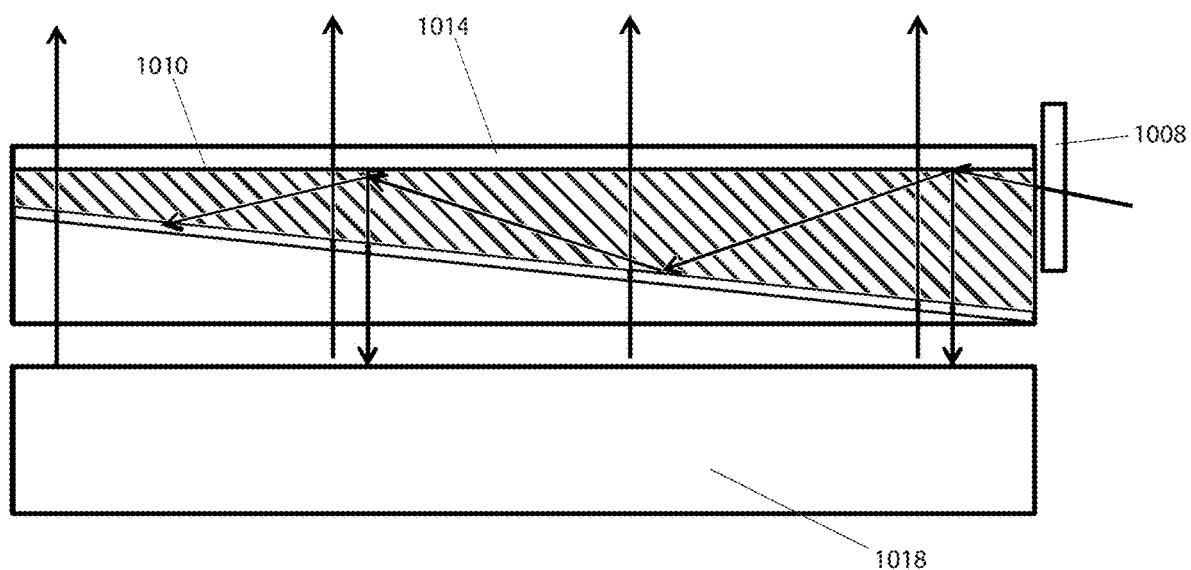
FIG. 18 illustrates a waveguide-based image source comprising a wedge-shaped waveguide.

In some embodiments, as illustrated in FIG. 18, a wedge-shaped waveguide 1010 may be employed. The waveguide 1010 has an inclined or curved surface that produces a taper of the waveguide 1010. Consequently, one end of the waveguide 1010 is thicker than another end. In the implementation shown in FIG. 18, the light source 1002 is at the thicker end and couples light into this thicker end. When the waveguide 1010 has a wedge shape (or a curved shape), the beam propagation angle can change as the light propagates in the waveguide. This change in propagation angle is cause by reflections off the inclined surface. Accordingly, the propagation angle can be tailored.

As discussed above, since both volume phase gratings and cholesteric liquid crystal grating can have narrow (or modest) angular responses (e.g., high efficiency within ±2° or ±10°, respectively), light within these ranges is extracted by the outcoupling optical element 1014. Light propagating within this angular range within a planar waveguide may be depleted as light outcoupled from the planar waveguide. However, as light propagates through the wedge-shaped or tapered (e.g., curved) waveguide, the propagation angle of the light beam progressively changes. As a result, the angle of light can change as it propagate until the angle reaches the suitable angle for outcoupling by the outcoupling optical element 1014. Light outcoupled from the wedge shaped or tapered waveguide 1010 can be more evenly distributed. This approach works when for light sources that have a large angle cone for output.

Examples

1. A display device comprising:
  one or more light emitters configured to emit light;
  a first waveguide disposed with respect to said one or more light emitters to receive light from said one or more light emitters, said first waveguide configured to (i) eject light out of said waveguide having a first color along a first path, and (ii) eject light out of said first waveguide having a second color along a second path; and
  a spatial light modulator disposed with respect to said first waveguide to receive said light ejected from said waveguide and modulate said light,
  wherein said one or more light emitters is configured to emit light having a spectral distribution that includes spectral components corresponding to said first and second colors, and
  wherein said display device is configured such that said light from said first waveguide of said first color and said second color after being modulated by said spatial light modulator is directed along said respective first and second paths at different angles and is incident on respective first and second spatial locations a distance from said first waveguide and spatial light modulator.

2. The display device of Example 1, wherein one or more light emitters comprise one or more light emitting diodes (LEDs).

3. The display device of Example 2, wherein one or more light emitters comprise one or more white light emitting diodes (WLEDs).

4. The display device of any of Examples 1-3, wherein said first waveguide is configured to (iii) eject light out of said first waveguide having a third color along a third path.

5. The display device of Example 4, wherein said spatial light modulator is disposed with respect to said first waveguide to receive said light of said third color ejected from said first waveguide and modulate said light, and said first waveguide is configured to direct said light after being modulated by said spatial light modulator along said third path so as to be is incident on a third spatial location different from said first and second spatial locations at a distance from said first waveguide and spatial light modulator.

6. The display device of any of Examples 1-5, further comprising:
  a second waveguide having associated therewith an in-coupling optical element disposed with respect to said first waveguide and said first path to receive light from said first waveguide after being modulated by said spatial light modulator; and
  a third waveguide having associated therewith an in-coupling optical element disposed with respect to said first waveguide and said second path to receive light from said first waveguide after being modulated by said spatial light modulator,
  wherein said in-coming optical elements associated with said second and third waveguides, respectively, are located at said first and second spatial locations along said first and second paths, respectively, to receive said light of said first and second colors, respectively.

7. The display device of Example 6, wherein said in-coupling optical elements associated with said second and third waveguides are configured to turn light into said second and third waveguides, respectively, such that said light is guided within said waveguides by total internal reflection.

8. The display device of Example 6 or 7, wherein said in-coupling optical elements for said second and third waveguides comprise turning features configured to redirect light into said second and third waveguides, respectively, to be guided therein by total internal reflection.

9. The display device of any of Examples 6-8, wherein said in-coupling optical elements comprise one or more diffractive optical elements, diffraction gratings, holographic optical elements, or metasurfaces.

10. The display device of any one of Examples 6-9, wherein one or more of said in-coupling optical elements comprise a wavelength selective optical element.

11. The display device of any of Examples 6-10, further comprising:
a fourth waveguide having associated therewith an in-coupling optical element disposed with respect to said first waveguide;
wherein said first waveguide is configured to (iii) eject light out of said first waveguide having a third color along a third path,
wherein said spatial light modulator is disposed with respect to said first waveguide to receive said light of said third color ejected from said first waveguide and modulate said light, and said first waveguide is configured to direct said light of said third color after being modulated by said spatial light modulator along a third path so as to be incident on a third spatial location different from said first and second spatial locations at a distance from said first waveguide and spatial light modulator, and
wherein said in-coming optical elements associated with said fourth respectively, is located at said third spatial locations along said third path to receive said light of said third color.

12. The display device of Example 11, wherein said in-coupling optical element associated with said fourth waveguide is configured to turn light into said fourth waveguide, such that said light is guided within said waveguide by total internal reflection.

13. The display device of Example 11 or 12, wherein said in-coupling optical element for said fourth waveguide comprises turning features configured to redirect light into said fourth waveguide to be guided therein by total internal reflection.

14. The display device of any of Examples 11-13, wherein said in-coupling optical element comprises one or more diffractive optical elements, diffraction gratings, holographic optical elements, or metasurfaces.

15. The display device of any one of Examples 11-14, wherein said in-coupling optical element associated with said fourth waveguide comprise a wavelength selective optical element.

16. The display device of any of the above examples, wherein said waveguide includes one or more turning elements configured to turn light guided within said waveguide by total internal reflection out of said waveguide.

17. The display device of Example 16, wherein said one or more turning elements comprise turning features configured to redirect light guided within said waveguide by total internal reflection out of said waveguide.

18. The display device of Example 16 or 17, wherein said one or more turning elements comprise one or more diffractive optical elements, diffraction gratings, holographic optical elements, or metasurfaces.

19. The display device of any one of Examples 16-18, wherein said one or more turning elements have wavelength dispersion.

20. The display device of any one of Examples 16-19, wherein said one or more turning elements comprise a wavelength selective optical element.

21. A display device comprising:
one or more light emitters configured to emit light;
a first waveguide disposed with respect to said one or more light emitters to receive light from said one or more light emitters such that said light is guided therein by total internal reflection, said first waveguide configured to eject light guided within said first waveguide out of said waveguide;
a shutter system comprising a first shutter and a second shutter and corresponding first and second color filters configured to selectively transmit first and second color light, respectively, said shutter system disposed with respect to said first waveguide to receive said light ejected from said waveguide such that light of said first and second colors from said first waveguide passes through said respective first and second color filters, respectively, as well as through said respective first shutter and second shutters along respective first and second optical paths to respective first and second spatial location at a distance from said first waveguide;
a spatial light modulator disposed with respect to said first waveguide to receive said light ejected from said waveguide and modulate said light, said shutter system disposed with respect to said spatial light modulator such that said modulated light is directed along said first and second optical paths to said respective first and second spatial location at a distance from said spatial light modulator; and
electronics in communication with said shutter system and said spatial light modulator to (i) open said shutter associated with said first color at a first time and close said shutter associated with said second color when said spatial light modulator is configured to present an image corresponding to said first color and (ii) to open said shutter associated with said second color and close said shutter associated with said first color at a second time when said spatial light modulator is configured to present an image corresponding to said second color,
wherein said one or more light emitters is configured to emit light having a spectral distribution that includes spectral components corresponding to said first and second colors.

22. The display device of Example 21, wherein one or more light emitters comprise one or more light emitting diodes (LEDs).

23. The display device of Example 22, wherein one or more light emitters comprise one or more white light emitting diodes (WLEDs).

24. The display device of any of Examples 21-23, wherein said shutter system includes a third shutter and a corresponding third color filter configured to selectively transmit a third color light, said shutter system disposed with respect to said first waveguide to receive said light ejected from said waveguide such that light of said third color from said first waveguide is selectively transmitted through said third color filter as well as through said third shutter along a respective third optical path to a third spatial location different separate from said first and second spatial locations at a distance from said first waveguide.

25. The display device of Example 24,
wherein said one or more light emitters is configured to emit light having a spectral distribution that includes spectral components corresponding to said third color,
wherein said shutter system is disposed with respect to said spatial light modulator such that said modulated light from said spatial light modulator is directed along said third optical path to said third spatial location at a distance from said spatial light modulator, and
wherein said electronics is configured to (iii) open said shutter associated with said third color at a third time and close said shutters associated with said first and second colors when said spatial light modulator is configured to present an image corresponding to said third color.

26. The display device of any of Examples 21-25, wherein said shutters are disposed along said optical path between said color filters and said spatial locations.

27. The display device of any of Examples 21-26, wherein said color filters are disposed along said optical path between said shutters and said spatial locations.

28. The display device of any of Examples 21-25, further comprising:

a second waveguide having associated therewith an in-coupling optical element disposed with respect to said first waveguide and said first path to receive light from first waveguide after being modulated by said spatial light modulator; and a third waveguide having associated therewith an in-coupling optical element disposed with respect to said first waveguide and said second path to receive light from first waveguide after being modulated by said spatial light modulator, wherein said in-coming optical elements associated with said second and third waveguides, respectively, are located at said first and second spatial locations along said first and second paths respectively to receive said light of said first and second colors, respectively.

29. The display device of Example 26, wherein said in-coupling optical elements associated with said second and third waveguides are configured to turn light into said second and third waveguides, respectively, such that said light is guided within said waveguides by total internal reflection.

30. The display device of Example 26 or 27, wherein said in-coupling optical elements for said second and third waveguides comprise turning features configured to redirect light into said second and third waveguides, respectively, to be guided therein by total internal reflection.

31. The display device of any of Examples 26-28, wherein said in-coupling optical elements comprise one or more diffractive optical elements, diffraction gratings, holographic optical elements, or metasurfaces.

32. The display device of any one of Examples 26-29, wherein one or more of said in-coupling optical elements comprise a wavelength selective optical element.

33. The display device of Example 25, further comprising:

a second waveguide having associated therewith an in-coupling optical element disposed with respect to said first waveguide and said first path to receive light from first waveguide after being modulated by said spatial light modulator; and a third waveguide having associated therewith an in-coupling optical element disposed with respect to said first waveguide and said second path to receive light from first waveguide after being modulated by said spatial light modulator, a fourth waveguide having associated therewith an in-coupling optical element disposed with respect to said first waveguide and said third path to receive light from first waveguide after being modulated by said spatial light modulator.

34. The display device of Example 33, wherein said in-coupling optical elements associated with said second, third, and fourth waveguides are configured to turn light into said second, third, and fourth waveguides, respectively, such that said light is guided within said waveguides by total internal reflection.

35. The display device of Example 34 or 35, wherein said in-coupling optical elements for said second, third, and fourth waveguides comprise turning features configured to redirect light into said second, third, and fourth waveguides, respectively, to be guided therein by total internal reflection.

36. The display device of any of Examples 33-35, wherein said in-coupling optical elements comprise one or more diffractive optical elements, diffraction gratings, holographic optical elements, or metasurfaces.

37. The display device of any one of Examples 33-36, wherein one or more of said in-coupling optical elements comprise a wavelength selective optical element.

38. The display device of any of the above examples, wherein said waveguide includes one or more turning elements configured to turn light guided within said waveguide by total internal reflection out of said waveguide.

39. The display device of Example 38, wherein said one or more turning elements comprise turning features configured to redirect light guided within said waveguide by total internal reflection out of said waveguide.

40. The display device of Example 38 or 39, wherein said one or more turning elements comprise one or more diffractive optical elements, diffraction gratings, holographic optical elements, or metasurfaces.

41. The display device of any one of Examples 38-40, wherein said one or more turning elements comprise a wavelength selective optical element.

42. A display device comprising:

one or more light emitters configured to emit light;

a first waveguide disposed with respect to said one or more light emitters to receive light from said one or more light emitters such that said light is guided therein by total internal reflection, said first waveguide configured to eject light guided within said first waveguide out of said waveguide;

a first beamsplitter configured to selectively direct light of a first spectral distribution and a first color light along a first direction and a second spectral distribution along a second direction, said first beamsplitter disposed with respect to said first waveguide to receive said light ejected from said waveguide such that light of said first and second spectral distributions from said first waveguide are incident on said first beamsplitter and said light having said first and second spectral distributions are directed along respective first and second optical paths, said light of said first spectral distribution and first color being directed to a respective first spatial location at a distance from said first waveguide; and a spatial light modulator disposed with respect to said first waveguide to receive said light ejected from said waveguide and modulate said light, said first beamsplitter disposed with respect to said spatial light modulator such that said modulated light is directed along said first and second optical paths and said light of said first color is directed to said first spatial location at a distance from said spatial light modulator, wherein said one or more light emitters is configured to emit light having a spectral distribution that includes spectral components corresponding to said first and second spectral distribution directed along said respective first and second optical paths.

43. The display device of Example 42, wherein one or more light emitters comprise one or more light emitting diodes (LEDs).

44. The display device of Example 43, wherein one or more light emitters comprise one or more white light emitting diodes (WLEDs).

45. The display device of any of Examples 42-44, further comprising a reflector to direct said light of said second spectral distribution output by said first beamsplitter to a second spatial location at a distance from said spatial light modulator.

46. The display device of any of Examples 42-45, further comprising a second beamsplitter configured to receive said light of said second spectral distribution output by said first beamspitter and selectively direct light of a second color along a second direction and a light of a third color along a third direction, said second beamsplitter disposed with respect to said first waveguide to receive said light ejected from said waveguide such that light of said second and third colors from said first waveguide is incident on said second beamsplitter and said respective second and third color light are directed along respective second and third optical paths to respective second and third spatial locations at a distance from said first waveguide.

47. The display device of Examples 46,
wherein said one or more light emitters is configured to emit light having a spectral distribution that includes spectral components corresponding to said second and third colors,
wherein said second beamsplitter is disposed with respect to said spatial light modulator such that said modulated light from said spatial light modulator having second and third colors is directed along said respective second and third optical paths to said respective second and third spatial locations at a distance from said spatial light modulator.

48. The display device of any of Examples 42-47, wherein said first beamsplitter is disposed along said optical path between said spatial light modulator and said first spatial locations.

49. The display device of Examples 46 or 47, wherein said first and second beamsplitters are disposed along said optical paths between said spatial light modulator and said first, second, and third spatial locations.

50. The display device of any of Examples 46, 47, or 49, wherein said first beamsplitter is disposed along an optical path between said second beamsplitter and said spatial light modulator.

51. The display device of any of Examples 46, 47, 49 or 50, wherein said second beamsplitter is disposed along an optical path between said first beamsplitter and said second and third spatial locations.

52. The display device of any of Examples 42-51, further comprising:
a second waveguide having associated therewith an in-coupling optical element disposed with respect to said first waveguide and said first path to receive light from said first waveguide after being modulated by said spatial light modulator; and
a third waveguide having associated therewith an in-coupling optical element disposed with respect to said first waveguide and said second path to receive light from said first waveguide after being modulated by said spatial light modulator,
wherein said in-coming optical elements associated with said second and third waveguides, respectively, are located at said first and second spatial locations along said first and second paths, respectively, to receive said light of first and second colors, respectively.

53. The display device of Example 52, wherein said in-coupling optical elements associated with said second and third waveguides are configured to turn light into said second and third waveguides, respectively, such that said light is guided within said waveguides by total internal reflection.

54. The display device of Example 52 or 53, wherein said in-coupling optical elements for said second and third waveguides comprise turning features configured to redirect light into said second and third waveguides, respectively, to be guided therein by total internal reflection.

55. The display device of any of Examples 52-53, wherein said in-coupling optical elements comprise one or more diffractive optical elements, diffraction gratings, holographic optical elements, or metasurfaces.

56. The display device of any one of Examples 52-55, wherein one or more of said in-coupling optical elements comprise a wavelength selective optical element.

57. The display device of Example 46, further comprising:
a second waveguide having associated therewith an in-coupling optical element disposed with respect to said first waveguide and said first path to receive light from said first waveguide after being modulated by said spatial light modulator; and
a third waveguide having associated therewith an in-coupling optical element disposed with respect to said first waveguide and said second path to receive light from said first waveguide after being modulated by said spatial light modulator,
a fourth waveguide having associated therewith an in-coupling optical element disposed with respect to said first waveguide and said third path to receive light from said first waveguide after being modulated by said spatial light modulator.

58. The display device of Example 57, wherein said in-coupling optical elements associated with said second, third, and fourth waveguides are configured to turn light into said second, third, and fourth waveguides, respectively, such that said light is guided within said waveguides by total internal reflection.

59. The display device of Example 57 or 58, wherein said in-coupling optical elements for said second, third, and fourth waveguides comprise turning features configured to redirect light into said second, third, and fourth waveguides, respectively, to be guided therein by total internal reflection.

60. The display device of any of Examples 57-59, wherein said in-coupling optical elements comprise one or more diffractive optical elements, diffraction gratings, holographic optical elements, or metasurfaces.

61. The display device of any one of Examples 57-60, wherein one or more of said in-coupling optical elements comprise a wavelength selective optical element.

62. The display device of any of the above examples, wherein said waveguide includes one or more turning elements configured to turn light guided within said waveguide by total internal reflection out of said waveguide.

63. The display device of Example 62, wherein said one or more turning elements comprise turning features configured to redirect light guided within said waveguide by total internal reflection out of said waveguide.

64. The display device of Example 62 or 63, wherein said one or more turning elements comprise one or more diffractive optical elements, diffraction gratings, holographic optical elements, or metasurfaces.

65. The display device of any one of Examples 62-64, wherein said one or more turning elements comprise a wavelength selective optical element.

Further Examples

1. A display device for a head mounted display comprising:
a waveguide based image source comprising:
one or more light emitters configured to emit light;
one or more waveguides disposed with respect to said one or more light emitters to receive light from said one or more light emitters such that light is guided within said one or more light guides via total internal reflection, said one or more waveguides configured to eject light out of said waveguides; and a spatial light modulator disposed with respect to one or more waveguides to receive said light ejected from said one or more waveguides and modulate said light, wherein said one or more light emitters are configured to emit light having a spectral distribution that includes spectral components corresponding to first and second colors, and said waveguide based image source is configured such that said light of said first and second colors after being modulated by said spatial light modulator is directed along said respective first and second paths and is incident on respective first and second spatial locations a distance from said one or more waveguides and said spatial light modulator, and an eyepiece element comprising a waveguide based light distribution system comprising:
 a first waveguide having associated therewith an in-coupling optical element disposed with respect to one or more first waveguides and said first path to receive light from said one or more waveguides after being modulated by said spatial light modulator; and
 a second waveguide having associated therewith an in-coupling optical element disposed with respect to said one or more waveguides and said second path to receive light from said one or more waveguides after being modulated by said spatial light modulator,
 wherein said in-coming optical elements associated with said first and second waveguides, respectively, are located at said first and second spatial locations along said first and second paths respectively to receive said light of said first and second colors, respectively.

42. The display system of Example 1, wherein one or more light emitters comprise one or more light emitting diodes (LEDs).

43. The display system of Example 2, wherein one or more light emitters comprise one or more white light emitting diodes (WLEDs).

44. The display system of any of Examples 1-3, wherein said waveguide based image source is configured to output light of a third color along a third path.

45. The display system of any of Examples 1-3, wherein said one or more light emitters are configured to emit light having a spectral distribution that includes spectral components corresponding to third color.

46. The display system of Example 5, wherein, said waveguide based image source is configured such that said light from of said third color after being modulated by said spatial light modulator is directed along a respective a third path different from said first and second paths such that said first, second, and third color light are incident on respective first second, and third spatial locations a distance from said one or more waveguides and spatial light modulator.

47. The display system of any of example 6, wherein said waveguide based light distribution system comprises a third waveguide having associated therewith one or more in-coupling optical elements disposed with respect to said one or more waveguides in said waveguide based image source and said third path to receive light from said one or more waveguides after being modulated by said spatial light modulator, said in-coming optical element associated with said third waveguide being located at said third spatial locations along said third path to receive said light of said third color light.

48. The display system of Example 7, wherein said in-coupling optical elements associated with said third waveguides are configured to turn light into said third waveguide, such that said light is guided within said third waveguide by total internal reflection.

49. The display system of Example 7 or 8, wherein said in-coupling optical elements for said third waveguide comprise turning features configured to redirect light into said third waveguide to be guided therein by total internal reflection.

50. The display system of any of the above examples, wherein said in-coupling optical elements associated with said first and second waveguides are configured to turn light into said first and second waveguides, respectively, such that said light is guided within said first and second waveguides by total internal reflection.

51. The display system of any of the above examples, wherein said in-coupling optical elements for said first and second waveguides comprise turning features configured to redirect light into said first and second waveguides, respectively, to be guided therein by total internal reflection.

52. The display system of any of the above examples, wherein said in-coupling optical elements comprise one or more diffractive optical elements, diffraction gratings, holographic optical elements, or metasurfaces.

53. The display system of any of the above examples, wherein one or more of said in-coupling optical elements comprise a wavelength selective optical element.

54. The display system of any of the above examples, wherein said one or more waveguides include one or more turning elements configured to turn light guided within said waveguide by total internal reflection out of said waveguide.

55. The display system of Example 14, wherein said one or more turning elements comprise turning features configured to redirect light guided within said waveguide by total internal reflection out of said waveguide.

56. The display system of Example 14 or 15, wherein said one or more turning elements comprise one or more diffractive optical elements, diffraction gratings, holographic optical elements, or metasurfaces.

57. The display system of any one of Examples 14-16, wherein said one or more turning elements comprise a wavelength selective optical element.

58. The display system of any of the above examples, wherein said waveguide based light distribution system comprise an exit pupil expander.

59. The display system of any of the above examples, wherein said a head mounted display comprises an augmented reality head mounted display system, said first and second waveguides in said eyepiece element being transparent.

Additional Examples

1. A display device comprising:
 a light source;
 a waveguide disposed with respect to said light to receive light from said light source, said waveguide including an outcoupling optical element configured to eject light out of said waveguide; and
 a spatial light modulator disposed with respect to said waveguide to receive said light ejected from said waveguides and modulate said light,
 wherein said outcoupling optical element comprises a volume phase grating.

2. A display device comprising:
a light source having a first spectral distribution;
a waveguide disposed with respect to said light to receive light from said light source, said waveguide including an outcoupling optical element configured to eject light out of said waveguide; and
a spatial light modulator disposed with respect to said waveguide to receive said light ejected from said waveguides and modulate said light,
wherein said outcoupling optical element comprises a liquid crystal.

3. The display device of Example 2, wherein said outcoupling optical element comprises a cholesteric liquid crystal.

4. The display device of Example 2, wherein said outcoupling optical element comprises a liquid crystal grating.

5. The display device of Example 2, wherein said outcoupling optical element comprises a cholesteric liquid crystal grating.

6. The display device of any of the above Examples, wherein display device is included in a augmented reality head mounted display to provide image content.

7. The display device of any of the above Examples, wherein said light from said modulator is directed to an eyepiece of an augmented reality head mounted display.

Further Additional Variations on Examples

The following examples can depend from any of the above examples in each of the sections (e.g., Section 1, Section 2, Section 3).

1. The display device of any of the Examples above, wherein the one or more light emitters comprise a point light source.

2. The display device of any of the Examples above, wherein the one or more light emitters comprise a line light source.

3. The display device of Example 3, wherein the one or more light emitters comprise a substantially linear arrangement of LEDs.

4. The display device of Example 3, wherein the substantially linear arrangement of LEDs is associated with a microlens array.

5. The display device of any of the Examples above, comprising a light guide directing light into the first waveguide.

6. The display device according to Example 5, wherein the light guide is disposed on a boundary of the first waveguide, and a reflective element is disposed along one boundary of the light guide.

7. The display device of any of the Examples above, wherein light is outcoupled from the first waveguide via a first outcoupling element.

8. The display device of Example 7, wherein the first outcoupling element comprises a volume phase grating.

9. The display device of Example 7, wherein the first outcoupling element comprises a cholesteric liquid crystal grating.

10. The display device of any of Example 7-9, wherein a diffraction efficiency of the first outcoupling element varies along a distance of the first outcoupling element to the one or more light emitters.

11. The display device of Example 10, wherein the diffraction efficiency decreases monotonically with increasing distance from the one or more light emitters.

12. The display device of any of Examples 7-11, wherein a pitch of the first outcoupling element varies along a distance of the first outcoupling element to the one or more light emitters.

13. The display device according to Examples 8-12, wherein the first outcoupling element comprises a stack of multiple layers.

14. The display device according to Example 13, wherein a first layer within the stack is configured to outcouple light of a first color from the first waveguide, and a second layer within the stack is configured to outcouple light of a second color from the first waveguide.

15. The display device according to Example 13, wherein a first layer within the stack is configured to outcouple a first color, and a second layer within the stack is configured to outcouple the first color.

16. The display device according to Example 13, wherein a first layer within the stack is configured to outcouple light encountering a boundary of the first waveguide at a first angle, and a second layer within the stack is configured to outcouple light encountering a boundary of the first waveguide at a second angle.

17. The display device according to Example 9, wherein a first quarter-wave retarder is disposed between the spatial light modulator and the first waveguide.

18. The display device according to Example 17, wherein a second quarter-wave retarder is disposed on a boundary of the waveguide opposite to the spatial light modulator.

19. The display device according to any of the Examples above, wherein the light from the one or more light emitters is directed substantially off an axis of the first waveguide.

20. The display device of Example 19, wherein the display device does not comprise focusing optics between the one or more light emitters and the first waveguide.

21. The display device of any of the Examples above, wherein the first waveguide is substantially wedge-shaped.

22. The display device of Example 21, wherein the wedge-shaped first waveguide is configured to change the angle of light reflecting off a boundary of the first waveguide.

It is contemplated that the innovative aspects may be implemented in or associated with a variety of applications and thus includes a wide range of variation. Variations, for example, in the shape, number, and/or optical power of the EPE's are contemplated. The structures, devices and methods described herein may particularly find use in displays such as wearable displays (e.g., head mounted displays) that can be used for augmented and/or virtually reality. More generally, the described embodiments may be implemented in any device, apparatus, or system that can be configured to display an image, whether in motion (such as video) or stationary (such as still images), and whether textual, graphical or pictorial. It is contemplated, however, that the described embodiments may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, head mounted displays and a variety of imaging systems. Thus, the teachings are not intended to be limited to the embodiments depicted solely in the Figures, but instead have wide applicability as will be readily apparent to one having ordinary skill in the art.

Various modifications to the embodiments described in this disclosure may be readily apparent to those skilled in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments. Additionally, a person having ordinary skill in the art will readily appreciate, the terms "upper" and "lower", "above" and "below", etc., are sometimes used for ease of describing the figures, and indicate relative positions corresponding to the orientation of the figure on a properly oriented page, and may not reflect the proper orientation of the structures described herein, as those structures are implemented.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A display device comprising:
 a first light emitter having a first spectral distribution;
 a first waveguide disposed with respect to said first light emitter to receive light from said first light emitter, said first waveguide configured to eject light out of said first waveguide along a first path;
 a second light emitter having a second spectral distribution different from said first spectral distribution of said first light emitter;
 a second waveguide disposed with respect to said second light emitter to receive light from said second light emitter, said second waveguide configured to eject light out of said second waveguide along a second path; and
 a spatial light modulator disposed with respect to said first and second waveguides to receive said light ejected from said first and second waveguides and modulate said light;
 a third light emitter having a third spectral distribution different from said first and second spectral distributions;
 a third waveguide disposed with respect to said third light emitter to receive light from said third light emitter, said third waveguide configured to eject light out of said third waveguide along a third path, said spatial light modulator disposed with respect to said third waveguide to receive said light ejected from said third waveguide and modulate said light and
 a fourth waveguide having associated therewith a first in-coupling optical element disposed with respect to the first waveguide and the first path to receive the light from the first waveguide after being modulated by the spatial light modulator,
 wherein said display device is configured such that said light from said first and second waveguides after being modulated by said spatial light modulator is directed along said first and second paths at different angles such that said light from said first waveguide and said light from said second waveguide after being modulated by said spatial light modulator are incident on respective first and second spatial locations a distance from said waveguides and spatial light modulator,
 wherein said display device is configured such that said light from said third waveguide after being modulated by said spatial light modulator is directed along said third path at a different angle from said first and second path such that said light from said first, second, and third waveguides after being modulated by said spatial light modulator are incident on respective first, second, and third spatial locations a distance from said waveguides and spatial light modulator, and
 wherein the first in-coupling element is located at the first spatial location along the first path to receive the light ejected from the first waveguide.

2. The display device of claim 1, wherein said first, second, and third light emitters comprise light emitting diodes (LEDs).

3. The display device of claim 2, wherein said first, second, and third light emitters comprise first, second, and third color light emitting diodes (LEDs), said first color LED having a different color than said second color LED and third color LED, and said second color LED having a different color than said third color LED.

4. The display device of claim 3, wherein said first, second, and third light emitters comprise red, green, and blue light emitting diodes (LEDs), respectively.

5. The display device of claim 1, wherein said first, second, and third waveguides comprise planar waveguides and said first, second, and third light emitters are disposed with respect to edges of said first, second, and third waveguides to inject light into an edge of said first, second, and third waveguides, respectively.

6. The display device of claim 1, wherein said first, second and third waveguides include turning features to eject light out of said first, second and third waveguides along first, second, and third paths, respectively.

7. The display device of claim 6, wherein said turning features form part of a diffractive optical element, a diffraction grating, a holographic optical element, or a metasurface.

8. The display device of claim 1, wherein the spatial light modulator comprises a transmissive spatial light modulator configured to modulate light transmitted through said spatial light modulator.

9. The display device of claim 1, wherein the spatial light modulator comprises a reflective spatial light modulator configured to reflect and modulate light incident thereon.

10. The display device of claim 1, further comprising:
 a fifth waveguide having associated therewith a second in-coupling optical element disposed with respect to the second waveguide and the second path to receive the light from the second waveguide after being modulated by the spatial light modulator, wherein the second in-coupling element is located at the second spatial location along the second path to receive the light ejected from the second waveguide.

11. The display device of claim 10, further comprising:
 a sixth waveguide having associated therewith a third in-coupling optical element disposed with respect to the third waveguide and the third path to receive the light from the third waveguide after being modulated by the spatial light modulator, wherein the third in-coupling element is located at the third spatial location along the third path to receive the light ejected from the third waveguide.

* * * * *